United States Patent
Rowny et al.

(10) Patent No.: US 10,305,843 B2
(45) Date of Patent: May 28, 2019

(54) MESSAGING OVER MULTIPLE CHANNELS

(71) Applicant: Google LLC, Mountain View, CA (US)

(72) Inventors: Andrew Rowny, San Francisco, CA (US); Shishir Kumar Agrawal, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 72 days.

(21) Appl. No.: 15/135,021

(22) Filed: Apr. 21, 2016

(65) Prior Publication Data
US 2016/0315900 A1   Oct. 27, 2016

Related U.S. Application Data

(60) Provisional application No. 62/150,830, filed on Apr. 21, 2015.

(51) Int. Cl.
| | |
|---|---|
| G06F 15/16 | (2006.01) |
| H04L 12/58 | (2006.01) |
| H04L 29/06 | (2006.01) |
| H04L 12/707 | (2013.01) |

(52) U.S. Cl.
CPC ............ H04L 51/28 (2013.01); H04L 45/24 (2013.01); H04L 69/14 (2013.01); *H04L 29/06088* (2013.01); *H04L 51/12* (2013.01); *H04L 51/14* (2013.01); *H04L 51/34* (2013.01); *H04L 51/38* (2013.01)

(58) Field of Classification Search
CPC ......... H04L 45/24; H04L 51/12; H04L 51/38; H04L 69/14; H04L 29/06088; H04L 51/28; H04L 51/34; H04L 51/14
USPC ........................ 709/206, 238, 239
See application file for complete search history.

(56) References Cited

U.S. PATENT DOCUMENTS

| | | | |
|---|---|---|---|
| 2002/0120697 A1* | 8/2002 | Generous ................ | H04L 29/06 709/206 |
| 2004/0019695 A1* | 1/2004 | Fellenstein .......... | G06Q 10/107 709/239 |
| 2009/0150489 A1* | 6/2009 | Davis .................. | G06Q 10/107 709/204 |
| 2010/0124196 A1 | 5/2010 | Bonar et al. | |

(Continued)

FOREIGN PATENT DOCUMENTS

EP   2461510   6/2012

OTHER PUBLICATIONS

International Search Report and Written Opinion in International Application No. PCT/US2016/028442, dated Aug. 1, 2016, 12 pages.

(Continued)

*Primary Examiner* — Liang Che A Wang
*Assistant Examiner* — Johnny B Aguiar
(74) *Attorney, Agent, or Firm* — Fish & Richardson P.C.

(57) ABSTRACT

In one implementation, a computer-implemented method, includes receiving, at a computer system, a message for delivery to a client computing device; determining, by the computer system, a unique identifier for the message; generating an identified message that includes the message and at least a portion of the unique identifier; and sending, by the computer system and to the client computing device, the identified message over a first communication channel and a second communication channel, wherein the first communication channel is different from the second communication channel.

13 Claims, 16 Drawing Sheets

(56) References Cited

U.S. PATENT DOCUMENTS

| | | | | |
|---|---|---|---|---|
| 2010/0312842 A1* | 12/2010 | Ladouceur | ............ | G06Q 10/10 709/206 |
| 2011/0060800 A1* | 3/2011 | Cohen | .................. | G06Q 10/107 709/206 |
| 2014/0012929 A1* | 1/2014 | Weishaupl | .............. | H04L 51/04 709/206 |
| 2015/0049639 A1* | 2/2015 | Angst | ................. | H04L 12/4641 370/254 |

OTHER PUBLICATIONS

International Preliminary Report on Patentability issued in International Application No. PCT/US2016/028442, dated Oct. 24, 2017, 9 pages.

* cited by examiner

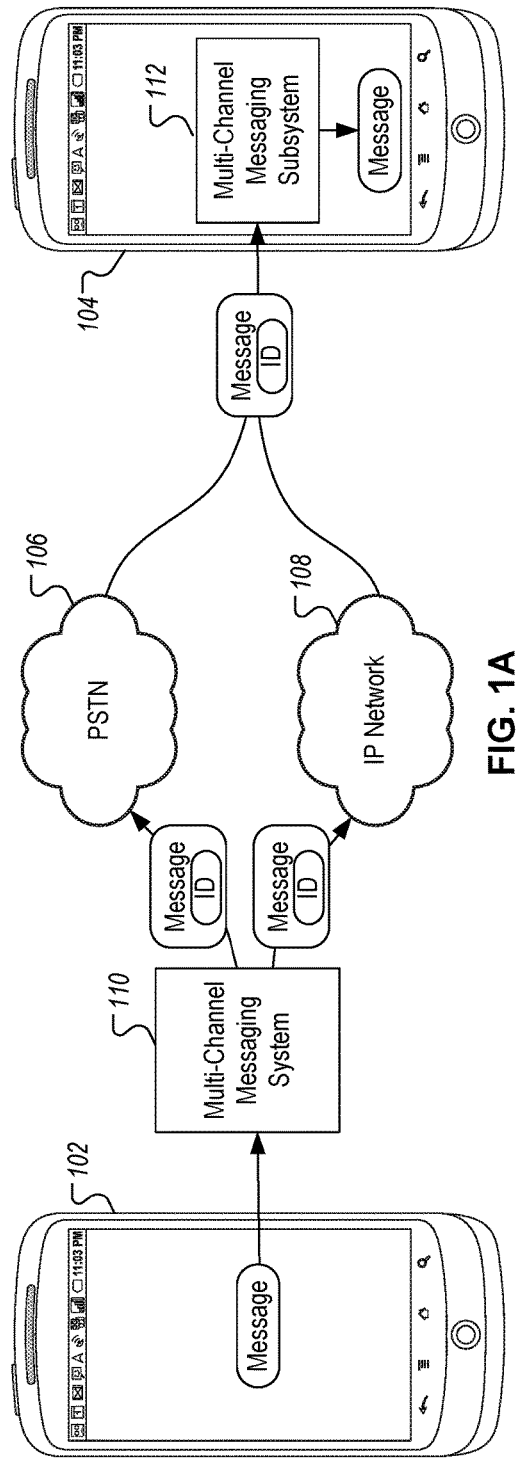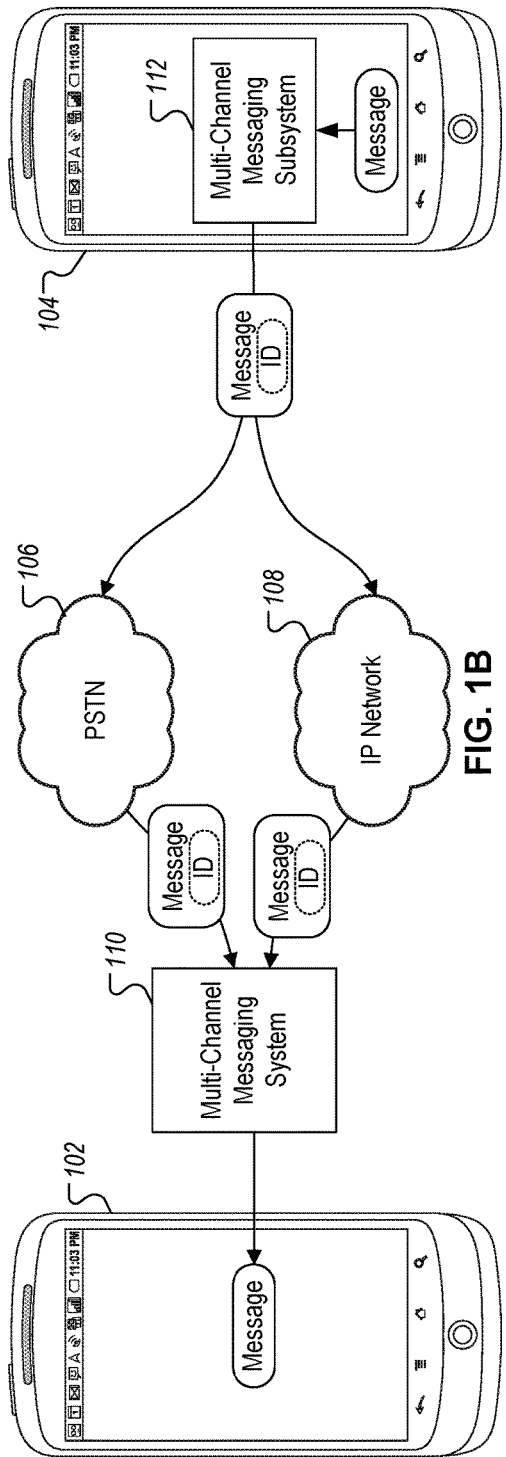

MESSAGING OVER MULTIPLE CHANNELS

CROSS-REFERENCE TO RELATED APPLICATIONS

This application claims the benefit of priority to U.S. Provisional Application Ser. No. 62/150,830, which is entitled "MESSAGING OVER MULTIPLE CHANNELS" and has a filing date of Apr. 21, 2015, the entire contents of which are incorporated herein by reference.

TECHNICAL FIELD

This document generally describes technology related to messaging on computing devices.

BACKGROUND

Mobile computing devices, such as smartphones and cellular telephones, can send and receive text messages, such as text messages sent through a short message service (SMS) and multimedia messages sent through a multimedia message service (MMS), through communication networks. For example, mobile computing devices can send and receive text messages over public switched telephone networks (PSTN), which can include telephone lines/cables, fiber optic cables, cellular networks, other wireless transmission links (e.g., communications satellites, microwave transmission links), or any combination thereof. In another example, mobile computing devices can send and receive text messages over IP networks, which can include the internet, mobile data networks, local area networks (LAN), wide area networks (WAN), wireless data networks (e.g., Wi-Fi, BLUETOOTH), or any combination thereof.

Mobile computing devices can run applications, such as mobile applications ("mobile apps"), to transmit and receive text messages. For example, users can install mobile apps to send and receive text messages on a mobile computing device over IP network connections, which can also be referred to as "over the top" (OTT) transmission of text messages. In another example, mobile devices can run applications, sometimes factory installed, to send and receive text messages over PSTN connections.

SUMMARY

This document describes devices, systems, and techniques that can be used to send and receive messages (e.g., text messages) over multiple communication channels, such as PSTN and IP network connections. For example, inbound and outbound messages can be transmitted over both PSTN and IP networks so that messages are sent and received with little interruption in service regardless of the type of connection that is available to a mobile computing device. Various components and techniques, such as inserting unique identifiers into messages, can be used to avoiding sending, receiving, and outputting duplicate messages when multiple communication channels, such as both PSTN and IP networks, are used for message transmission.

In one implementation, a computer-implemented method includes receiving, at a computer system, a message for delivery to a client computing device; determining, by the computer system, a unique identifier for the message; generating an identified message that includes the message and at least a portion of the unique identifier; and sending, by the computer system and to the client computing device, the identified message over a first communication channel and a second communication channel, wherein the first communication channel is different from the second communication channel.

Such a computer-implemented method can optionally include one or more of the following features, which may be combined with each other in various sub-combinations. The unique identifier can include a recipient identifier for the client computing device that is to receive the message, a sender identifier for another client computing device that sent the message, and an interaction identifier that is unique to messages associated with the recipient identifier and the sender identifier. The recipient identifier and the sender identifier can be included in the message, and the interaction identifier can be added to the identified message as the at least a portion of the unique identifier. The message can be a text message. The first communication channel can be a public switched telephone network (PSTN) and the second communication channel can be an internet protocol (IP) network. The computer-implemented method can further include receiving, at the computer system and over the first communication channel, a reply message from the client computing device that is intended to be delivered to another computing device that sent the message; identifying a reply unique identifier in the reply message; storing, by the computer system, the reply unique identifier in a repository of sent messages; generating, by the computer system, a modified reply message that includes the reply message with at least a portion of the reply unique identifier removed; and sending, by the computer system, the modified reply message to the other computing device. The computer-implemented method can further include receiving, at the computer system and over the second communication channel, a second instance of the reply message; determining that the second instance of the reply message is a duplicate based on a comparison of a unique identifier in the second instance of the reply message with the repository of sent messages; and discarding, by the computer system and in response to the determining, the second instance of the reply message.

In another implementation, a computer-implemented method can include receiving, at a client computing device and over a first communication channel, a message from another client computing device; identifying, by the client computing device, a unique identifier in the message; determining, by the client computing device, that the message is not a duplicate based on a comparison of the unique identifier with a repository of unique message identifiers; storing, in response to the determining, the unique identifier in the repository of unique message identifiers; generating, by the client computing device, a modified message that includes the message with at least a portion of the unique identifier removed; and causing the modified message to be presented by the client computing device.

Such a computer-implemented method can optionally include one or more of the following features, which may be combined with each other in various sub-combinations. The computer-implemented method can further include receiving, at the client computing device and over a second communication channel that is different from the first communication channel, a second instance of the message; determining that the second instance of the message is a duplicate of the message based on comparison of a unique identifier in the second instance of the message with the repository of unique message identifiers; and discarding, by the client computing device and in response to the determining, the second instance of the message. The unique identifier can be a recipient identifier for the client computing device, a sender identifier for the other client computing device, and an interaction identifier that is unique to messages associated with the recipient identifier and the sender identifier. The recipient identifier and the sender identifier can be included in the message, and at least the interaction identifier and the sender identifier are stored in the repository of unique message identifiers. The message can be a text message. The first communication channel can be an IP network and the second communication channel includes a PSTN.

In another implementation, a computer system for sending messages over multiple channels can include one or more processors; memory storing instructions that, when executed, cause the processors to perform operations including: receive a message for delivery to a client computing device; determine a unique identifier for the message; generate an identified message that includes the message and at least a portion of the unique identifier; and send, to the client computing device, the identified message over a first communication channel and a second communication channel, wherein the first communication channel is different from the second communication channel.

Such a computer-implemented method can optionally include one or more of the following features, which may be combined with each other in various sub-combinations. The unique identifier can be a recipient identifier for the client computing device that is to receive the message, a sender identifier for another client computing device that sent the message, and an interaction identifier that is unique to messages associated with the recipient identifier and the sender identifier. The recipient identifier and the sender identifier can be included in the message, and the interaction identifier is added to the identified message as the at least a portion of the unique identifier. The message can be a text message. The first communication channel can be a public switched telephone network (PSTN) and the second communication channel includes an internet protocol (IP) network. The operations can further include receive, and over the first communication channel, a reply message from the client computing device that is intended to be delivered to another computing device that sent the message; identify a reply unique identifier in the reply message; store the reply unique identifier in a repository of sent messages; generate a modified reply message that includes the reply message with at least a portion of the reply unique identifier removed; and send the modified reply message to the other computing device. The operations can further include receive, over the second communication channel, a second instance of the reply message; determine that the second instance of the reply message is a duplicate based on a comparison of a unique identifier in the second instance of the reply message with the repository of sent messages; and discard, in response to the determining, the second instance of the reply message.

Certain implementations may provide one or more advantages. For example, in one implementation, the disclosed technology includes receiving, at a computer system, a message for delivery to a client computing device, determining, by the computer system, a unique identifier for the message, generating an identified message that includes the message and at least a portion of the unique identifier, and sending, by the computer system and to the client computing device, the identified message over a first communication channel and a second communication channel, wherein the first communication channel is different from the second communication channel and therefore can allow for messages to be reliably sent and received by the client computing device like a mobile computing device regardless of the type of network connection (PSTN, IP network) that is currently being used. In an example, according to another implementation, this advantage is achieved by the disclosed technology including receiving, at a client computing device and over a first communication channel, a message from another client computing device, identifying, by the client computing device, a unique identifier in the message, determining, by the client computing device, that the message is not a duplicate based on a comparison of the unique identifier with a repository of unique message identifiers, storing, in response to the determining, the unique identifier in the repository of unique message identifiers, generating, by the client computing device, a modified message that includes the message with at least a portion of the unique identifier removed, and causing the modified message to be presented by the client computing device.

In another example, the disclosed technology allows for a mobile computing device to use both PSTN and IP networks to send and receive messages independent of the messaging application that is being used by another mobile computing device at the other end of the communication. For instance, some applications that are capable of using both PSTN and IP connections to transmit messages are only able to use both types of connections when both the sender and recipient devices are using the same application. Such a configuration can restrict the set of other devices to which and from which messages can be received over both PSTN and IP connections. In contrast, the technology disclosed in this document allows a mobile computing device to send and receive messages over PSTN and IP connections to any other mobile device regardless of the messaging application(s) that are installed and running on the other devices.

In a further example, in one implementation, the disclosed technology includes receiving, at the computer system and over the second communication channel, a second instance of the reply message, determining that the second instance of the reply message is a duplicate based on a comparison of a unique identifier in the second instance of the reply message with the repository of sent messages, and discarding, by the computer system and in response to the determining, the second instance of the reply message and thus can eliminate duplicate transmission, delivery, and outputting (e.g., display, audio output) of messages when the messages are sent over both communication channels like the PSTN and IP networks. This can allow for both PSTN and IP networks to be used for message transmissions without compromising the integrity, reliability, and user experience associated with messaging features on mobile computing devices.

The details of one or more embodiments are set forth in the accompanying drawings and the description below. Other features and advantages will be apparent from the description and drawings, and from the claims.

DESCRIPTION OF DRAWINGS

FIGS. 1A-B are conceptual diagrams that depict example outbound and inbound transmission of messages between computing devices over multiple communication channels.

Like reference symbols in the various drawings indicate like elements.

DETAILED DESCRIPTION

Figure 2:
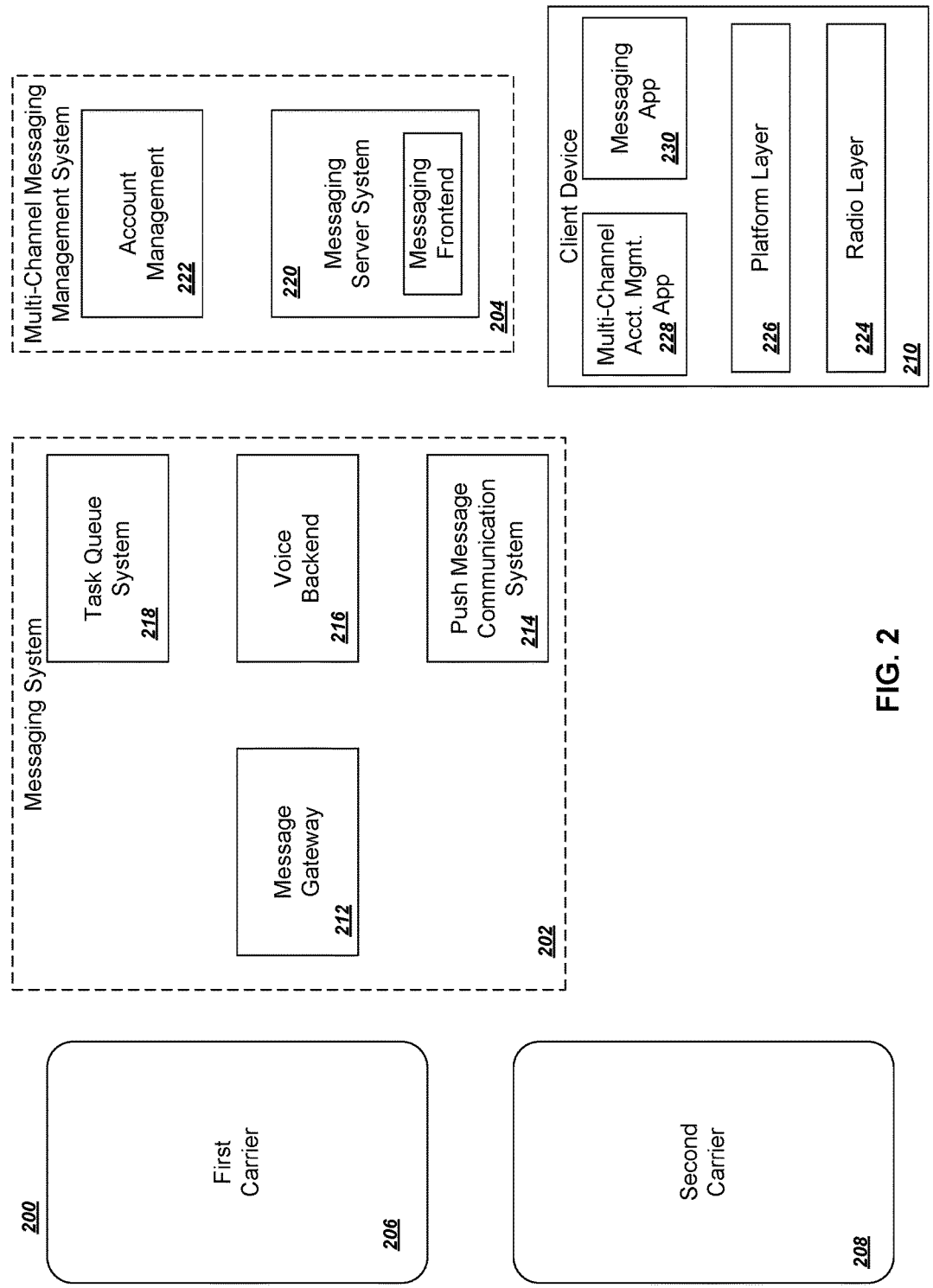
FIG. 2 depicts an example system for transmitting messages over multiple communication channels.

This document generally describes technology for sending and receiving messages (e.g., SMS, MMS) over multiple communication channels, such as PSTN and IP network channels, with a mobile computing device (e.g., smartphone, cell phone, wearable device, tablet computing device). As discussed throughout this document, a variety of techniques can be used to ensure delivery of messages over multiple communication channels and to avoid delivery and/or presentation of duplicate messages when multiple communication channels are used, such as through the use of unique identifiers that are transmitted with messages.

For example, users generally want to receive a messages (e.g., SMS, MMS) quickly and reliably regardless of whether their mobile computing devices are, for example, 1) connected to a mobile network with data access, 2) roaming with cell data off, or 3) not connected to a cellular network (example PSTN network) but connected to the Internet over Wi-Fi. Sending messages over legacy PSTNs can limit the reliability, reach, and performance of message delivery due to inherent constraints of how messages are routed and the ecosystem that exists around message delivery (including multiple middleman companies). For example, a user with a device in scenario #3 above (connected over Wi-Fi only) would not be able to receive a message transmitted over a PSTN.

Similarly, while sending messages over the top via IP networks may be helpful when PSTN communication channels are not available, transmitting messages using IP networks does not resolve the problem. Instead, as with PSTN-based message transmission, IP network-based transmissions of messages are not available without a data connection. For example, messages sent over IP network wouldn't make it to a recipient mobile device in situation #2 above (roaming with cell data off).

This document describes frameworks and techniques for sending messages via multiple communication channels, such as PSTN and IP network channels, in ways that select one or more appropriate channels for transmitting message and that de-duplicate messages so that multiple instances of the same message are not delivered/output when it is sent over multiple channels. Such use of multiple communication channels for message delivery can be faster and more reliable than either form alone, including for all three types of scenarios #1-3 highlighted above (connected to mobile network with data access, roaming with cell data off, connected over Wi-Fi only).

Messages can be transmitted between client computing devices (e.g., mobile computing devices) over both IP and multiple PSTN networks through the use of unique identifiers that can be included in messages. For example, a sending client device and/or a messaging system (remote from the client device that handles at least a portion of the message transmission) can insert unique identifiers into messages. A recipient client device can then filter all inbound messages before showing them to the user and can strip out the identifiers that are included in the messages, dropping any messages that match a previously seen identifier.

Identifiers that are used can be unique either alone or in combination with other message information. For example, identifiers can be globally unique, unique to the sender, unique to the recipient, unique to the sender/recipient pair, unique based on heuristics (e.g., content, timestamp), and/or any combination thereof. For instance, the identifier can be unique to other identifiers for messages transmitted between the sender and recipient, and a sender/recipient/identifier triplet can be used to filter messages.

Outbound messages can be delivered over multiple communication channels, such as IP and PSTN, to the server. Timeouts can be used to send messages first over a primary channel that, when unavailable, defaults to a secondary channel as a backup for message transmission. Outbound messages can use identifiers to eliminate duplicate messages as well. For instance, a heuristics based approach can be used to eliminate duplicate messages based on, for example, a sender/recipient/content/timestamp combination.

Outbound traffic transmitted over PSTN can be home-routed over particular servers to allow the "from" number to be rewritten to maintain consistency between messages sent over two different cellular networks using two different subscriber profiles. This can help avoid problems associated with delivering messages across multiple carrier networks while maintaining a consistent number. Home-routing PSTN-transmitted messages can allow users to seamlessly move between different carriers, which can increase the reach of messaging.

As discussed above, a variety of advantages can be provided by these techniques. For example, using identifiers with messages can reduce the number of duplicates that are shown. In another example, home-routing messages can allow multiple PSTN networks to be used seamlessly.

FIGS. 1A-B are conceptual diagrams that depict example outbound and inbound transmission of messages between computing devices 102 and 104 over multiple communication channels. The example computing devices 102 and 104 can be any of a variety of appropriate computing devices, such as smartphones, cell phones, tablet computing devices, wearable computing devices, embedded computing devices, and/or non-mobile computing devices. The example communication channels that are depicted include a PSTN 106 and an IP network 108. The examples depicted in FIGS. 1A-B can be applied to other communication channels, including subsets of the PSTN 106 and the IP network 108.

FIG. 1A depicts inbound transmission of a message (e.g., SMS, MMS, message sent via other messaging protocol(s)) across the multiple communication channels 106 and 108 to the computing device 104. The example message is transmitted by the computing device 102, such as through a PSTN or IP network connection that is being used by the computing device 102, and is routed to a multi-channel messaging system 110 that is associated with the computing device 104. For example, a telecommunications carrier (not depicted) that is associated with the computing device 104 can be configured to route messages for the computing device 104 to the multi-channel messaging system 110, which can process and deliver messages to the computing device 104 over the multiple communication channels 106 and 108.

The multi-channel messaging system 110 receives the message and inserts an identifier (ID) into the message and then transmits the message, with the identifier, over one or both of the communication channels 106 and 108. As discussed above, the identifier, either alone or in combination with other information that is part of the message (e.g., sender identifier (phone number, user ID, email address), recipient identifier, timestamp, content), can provide unique identification of the message so that, in the event the message is delivered to the computing device 104 in duplicate, the duplicates can be identified and removed. The multi-channel messaging system 110 may, in some instances, first attempt to transmit the message with the identifier over one of the communication channels 106 and 108, before attempting to transmit the message over the other channel. In some instances, the message can be transmitted simultaneously or in series across both channels 106 and 108.

In the depicted example, the computing device 104 can include one or more network connections via the multiple communication channels 106 and 108. The described techniques using the multi-channel messaging system 110 and a multi-channel messaging subsystem 112 on the computing device 104 can allow for the message to reach the device 104 regardless of which of the communication channels 106 and 108 are being used by the device 104.

The computing device 104 includes a multi-channel messaging subsystem 112 that is programmed to handle receipt, processing, and output of the message over either or both of the communication channels 106 and 108. The messaging subsystem 112 can use the identifier to eliminate duplicate messages that are received. For example, in the first instance of receiving the message, the messaging subsystem 112 can strip the identifier out of the message, insert the message into a local cache of messages on the device 104, and can log the unique identifier for the message (e.g., ID alone, sender/recipient/ID triplet, ID/heuristics/sender triplet). In second and later instances of the message, the messaging subsystem 112 can check the unique identifier for the message against the log of unique identifiers for previously received messages and, when a match is found, can delete/remove the newly received instance of the message from the device 104, or store the newly-received instance of the message but not present the message to a user.

The messaging subsystem 112 can include one or more of a radio layer on the device 104, a platform layer on the device 104, a messaging account application installed on the device 104, and a messaging application installed on the device 104. Such components can work in concert to seamlessly integrate and filter duplicate messages that are received over the multiple communication channels 106 and 108, as described with regard to FIGS. 2-4 below.

Once the message has been inserted into a local repository of messages on the device 104, one or more applications and/or services that are running on the device 104 can alert and/or output information about the message to a user of the device 104.

FIG. 1B depicts the outbound transmission of a message by the computing device 104 over one or more of the communication channels 106 and 108. A new message that is input through the device 104 (e.g., through user input with a touchscreen or microphone) is received by the messaging subsystem 112, which handles transmission of the message over one or more of the communication channels 106 and 108. In some instances, the messaging subsystem 112 can attempt to transmit the message over one of the channels 106/108 first and, if that is unsuccessful, can attempt to transmit the message over the other channel. In other instances, the messaging subsystem 112 can transmit the message simultaneously or in series across both channels 106 and 108.

For outbound messages, the messaging subsystem 112 can optionally insert an identifier into the message before it is transmitted over the channels 106 and 108. The identifier (ID) can be similar to the identifier that is used for inbound messages and described above with regard to FIG. 1A. For example, the identifier can be an identifier that, either alone or in combination with other information in the message, provides unique identification of the message. In some instances, the identifier can be provided through heuristics that are part of the message (e.g., timestamp, content).

The multi-channel messaging system 110 can receive the message and, similar to how the messaging subsystem 112 handles inbound messages (described above with regard to FIG. 1A), can store information that uniquely identifies the message (e.g., ID alone, sender/recipient/ID triplet, heuristics), can remove any identifiers from the message, and can transmit the message to the computing device 102.

The outbound messaging system described in FIG. 1B can allow for the device 104 to transmit outbound messages regardless of which of the communication channels 106 and 108 are available to the device 104.

FIG. 2 depicts an example system 200 for transmitting messages over multiple communication channels. The example system 200 includes a messaging system 202, a multi-channel messaging management system 204, example first and second carriers 206-208, and a client device 210. The example system 200 can implement the inbound and outbound messages described above with regard to FIGS. 1A-B.

The message system 202 is programmed to manage sending and receiving messages over multiple communication channels, such as PSTN and IP networks. The message system 202 includes a message gateway 212 that handles incoming/outgoing messages exchanges with the carriers 206-208 (message transmission over a PSTN channel); a push message communication system 214 that handles all push message communication with client computing devices (message transmission over IP networks); a voice backend 216; and a task queue system 218 that includes a queue of tasks to be performed by the system 202.

The multi-channel messaging management system 204 includes a messaging server system 220 that includes multi-channel specific logic for message routing and an account management module 222 that stores mappings between communication channel identifiers (e.g., GAIA to phone number mappings). The messaging system 202 and the multi-channel messaging management system 204 can be part of the same or separate systems. For example, the messaging system 202 and the multi-channel messaging management system 204 can both be part of the multi-channel messaging system 110 described above with regard to FIGS. 1A-B.

The first and second carriers 206-208 can be telecommunication carriers that provide access to PSTNs. In the depicted example, the first carrier 206 can be a primary carrier for the messaging system 202 and the multi-channel messaging management system 204, and can be publicly visible for phone numbers for client devices using the services of the messaging system 202 and the multi-channel messaging management system 204, such as the client device 210. The example second carrier 206 can be part of another network onto which client devices of the multi-channel messaging system 204 can roam, such as through using a different SIM profile.

The client device 210 can be any of a variety of appropriate devices, such as the computing device 104. The example client device 210 includes a radio layer 224 that handles sending/receiving bits over a wireless PSTN network; a platform layer 226 that holds system APIs available to apps and messaging databases (e.g., SMS database) that messaging apps can read from and write to; a multi-channel account management app 228 that can be a carrier app that has special system API permissions; and a messenger app 230 that can provide a user interface through which users can send, receive, and output messages on the client device.

The interaction of the components of the example system 200 depicted in FIG. 2 to send and receive messages over multi-channel communication networks is depicted and described with regard to FIGS. 3A-G and 4A-D.

FIGS. 3A-G depict transmission of an incoming message 300 over multiple communication channels using the example system 200 described in FIG. 2. The steps described across FIGS. 3A-G correspond to the incoming message 300 delivery described above with regard to FIG. 1A.

Figure 3A:
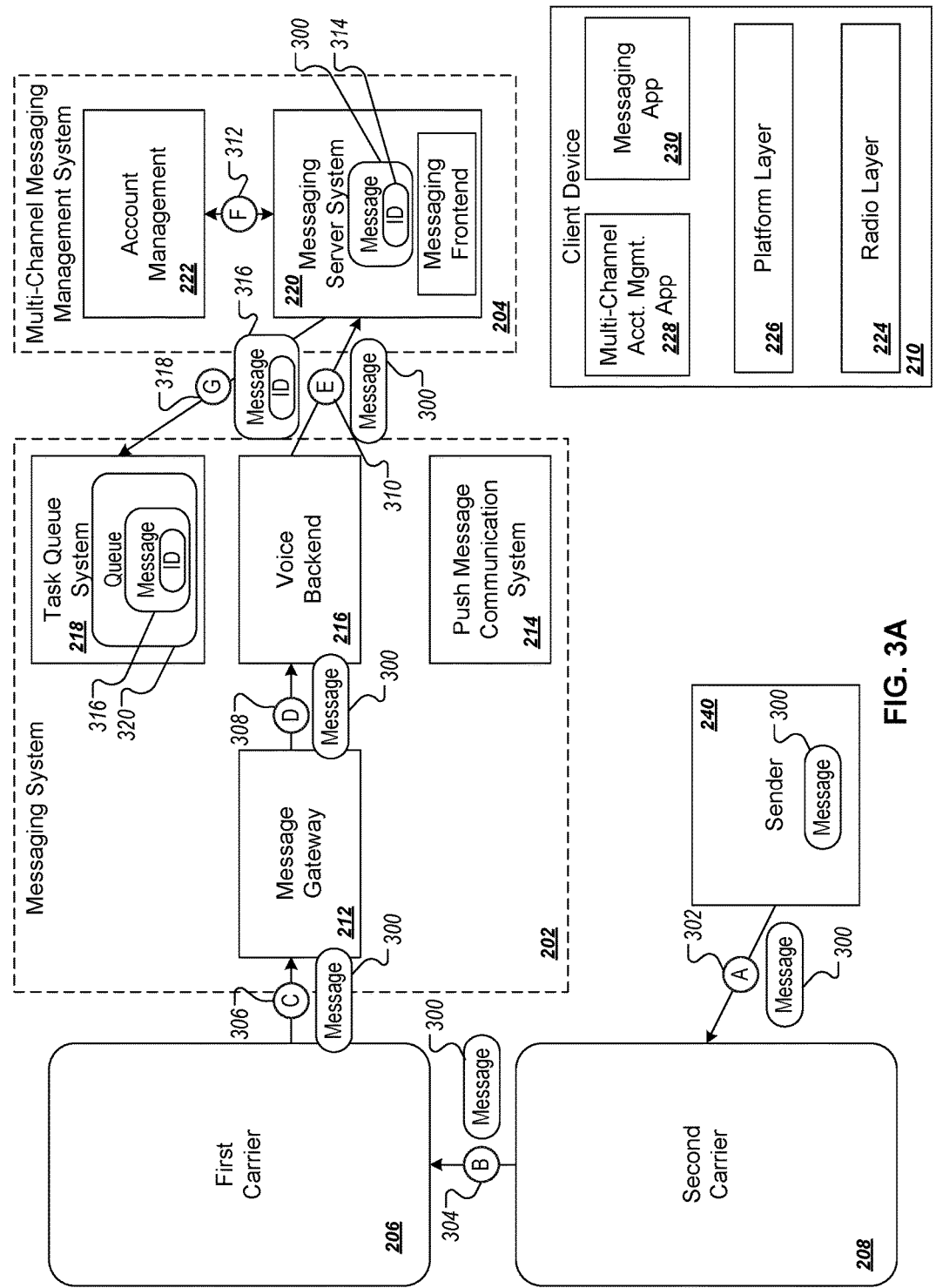
FIGS. 3A-G depict transmission of an incoming message over multiple communication channels using the example system described in FIG. 2.

Referring to FIG. 3A, a user of a sender device 240 (other client computing device, such as a mobile computing device) enters a message 300 and hits send, which causes the message 300 (e.g., SMS message, MMS message) to be transmitted by the sender device 240 to the second carrier that is associated with the sender device (Step A, 302). The message 300 can include identifiers for the recipient and sender, such as telephone numbers associated with the client device 210 and the sender device 240, respectively. Other identifiers for the recipient and sender may also be used in the message 300, such as email addresses, account identifiers, and/or other appropriate identifiers. The message 300 can also include a payload (content), such as text, images, video files, audio files, and/or other multimedia files.

The sender's carrier (second carrier 208) looks up the number for the recipient (example client device 210) in a central database and determines that the recipient's number is associated with the first carrier 206, which causes the second carrier 208 to forward the message 300 to the first carrier 206 (Step B, 304). The first carrier 206 recognizes that the recipient number is associated with the messaging system 202 and passes the message 300 to the message gateway 212 (Step C, 306). The first carrier 206 can reference a database that identifies which numbers served by the first carrier 206 are associated (enrolled with) the messaging system 202. The message gateway 212 of the messaging system 202 can pass the message 300 to the voice backend 216 (Step D, 308), which can determine that the recipient is a multi-channel messaging user (associated/enrolled with the multi-channel messaging system 202) and can pass the message 300 to the messaging server system 220 of the multi-channel messaging management system 204 (Step E, 310). For example, the client device 210 can be associated with the multi-channel messaging system 204 when it installs/enables/activates the multi-channel account management application 228 on the client device 210 (conversely, the client device 210 may be unassociated with the multi-channel messaging system 202 if the multi-channel account management application 228 is uninstalled/disabled/deactivated on the client device 210).

Steps A-E (302-310) cover delivery of a message 300 to the multi-channel messaging management system 204 from a device 240 that is not associated with the multi-channel messaging management system 204. Messages sent by devices that are associated with the multi-channel messaging management system 204 can be delivered to the multi-channel messaging management system 204 as described below with regard to FIGS. 4A-D.

The messaging server system 220 can double check with the account management component 222 to make sure that the recipient is associated with the multi-channel messaging management system 204 (Step F, 312), and can insert/add an identifier into the message 300, as indicated by the ID 314 being inserted into the message 300. As discussed above, the identifier (ID 314) can be globally unique (e.g., unique across all transmitted messages) and/or locally unique (e.g., unique with regard to messages between the sender 240 and the recipient device 210, unique with regard to the multi-channel messaging management system 204). For example, the ID 314 can be an identifier that uniquely identifies the message 300 with regard to messages transmitted between the sender 240 and the recipient device 210, and when combined with the phone numbers for those devices 210, 240 can be a globally unique identifier for the message 300.

The messaging server system 220 can send a copy 316 of the message 300 with ID 314 to the task queue system 218 (Step G, 318), which can insert the copy 316 into a message queue 320 attempt delivery, for example, over a first example communication channel (PSTN) if delivery over a second example communication channel (IP) is not successful within a threshold period of time (e.g., 1 second, 2 seconds, 5 seconds, 10 seconds, 1 minute). Other delivery schemes by the task queue system 218 over the first and second communication channels are also possible (as discussed above), such as first attempting delivery over a PSTN channel and, if not successful within a threshold period of time, delivering over an IP channel, and/or simultaneously delivering over both the PSTN and IP channel. Other transmission schemes are also possible.

Figure 3B:
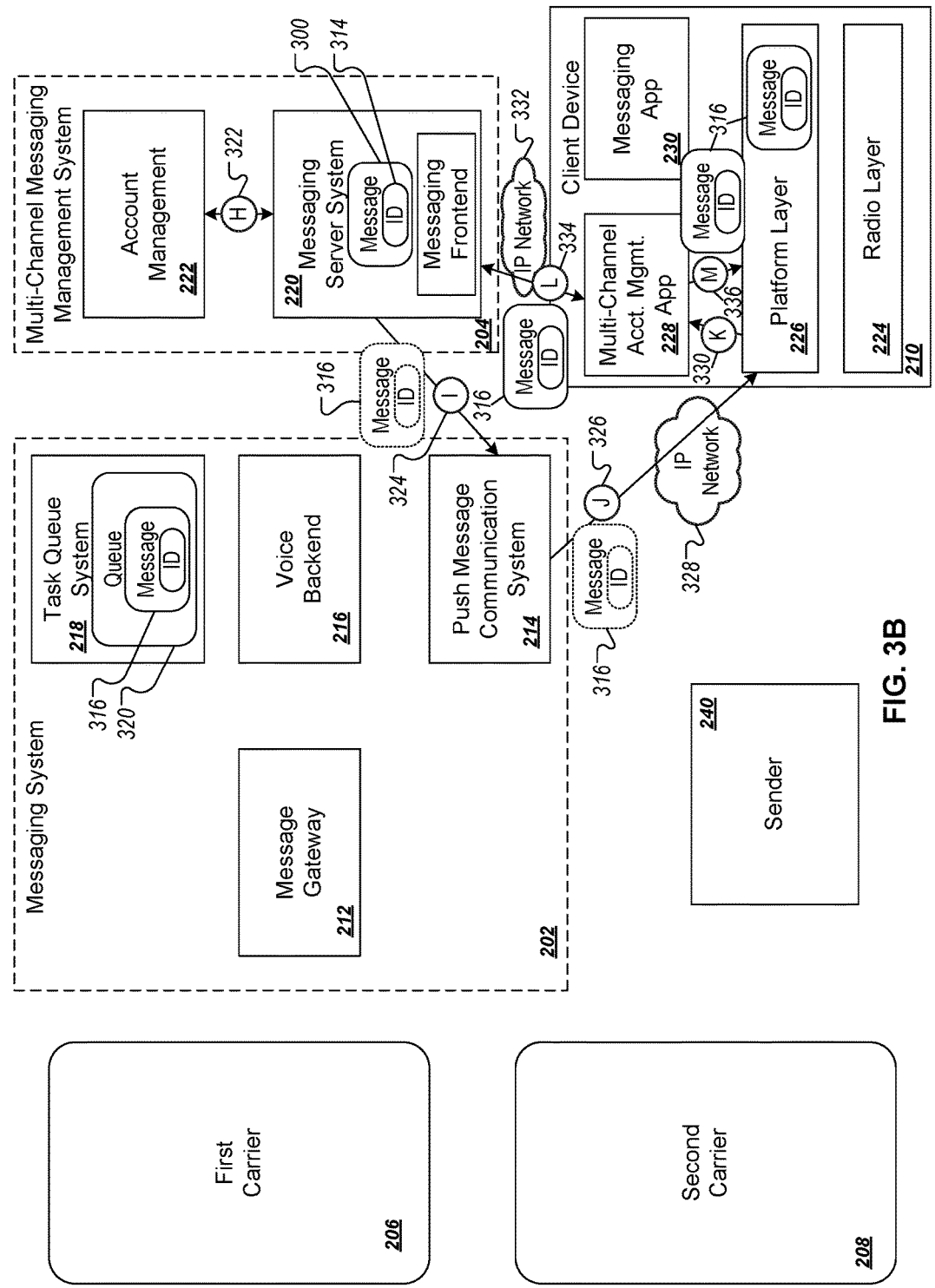

Referring to FIG. 3B, in order to deliver the message 300 over an IP communication channel, the messaging server system 202 can look up an IP identifier (e.g., GCM ID) associated with the recipient phone number (Step H, 322), which can be provided to the push message communication system 214 (Step I, 324) and used to alert the client device 210 over an IP network 328 that there is a message for the device 210 (Step J, 326). In instances where the message 316 (with ID 314) is small enough to be delivered as part of the notification (e.g., less than a threshold size), the message 316 can be pushed by the push message communication system 214 directly into the platform layer 226 of the client device 210 (Steps I-J, 324-326).

In instances where the message 3316 is too large to be pushed directly, the platform layer 226 can provide the alert to the multi-channel account management app 228 (Step K, 330), which can cause the multi-channel account management app 228 to retrieve (pull down) the message 316 from the messaging server system 204 over an IP network 332 (Step L, 334). The IP network 328 can be the same as or different from the IP network 332. Once the message 316 has been retrieved over an IP communication channel (IP networks 328 and/or 332), the message 316 can be inserted into the message database in the platform layer 226 (Step M, 336).

Figure 3C:
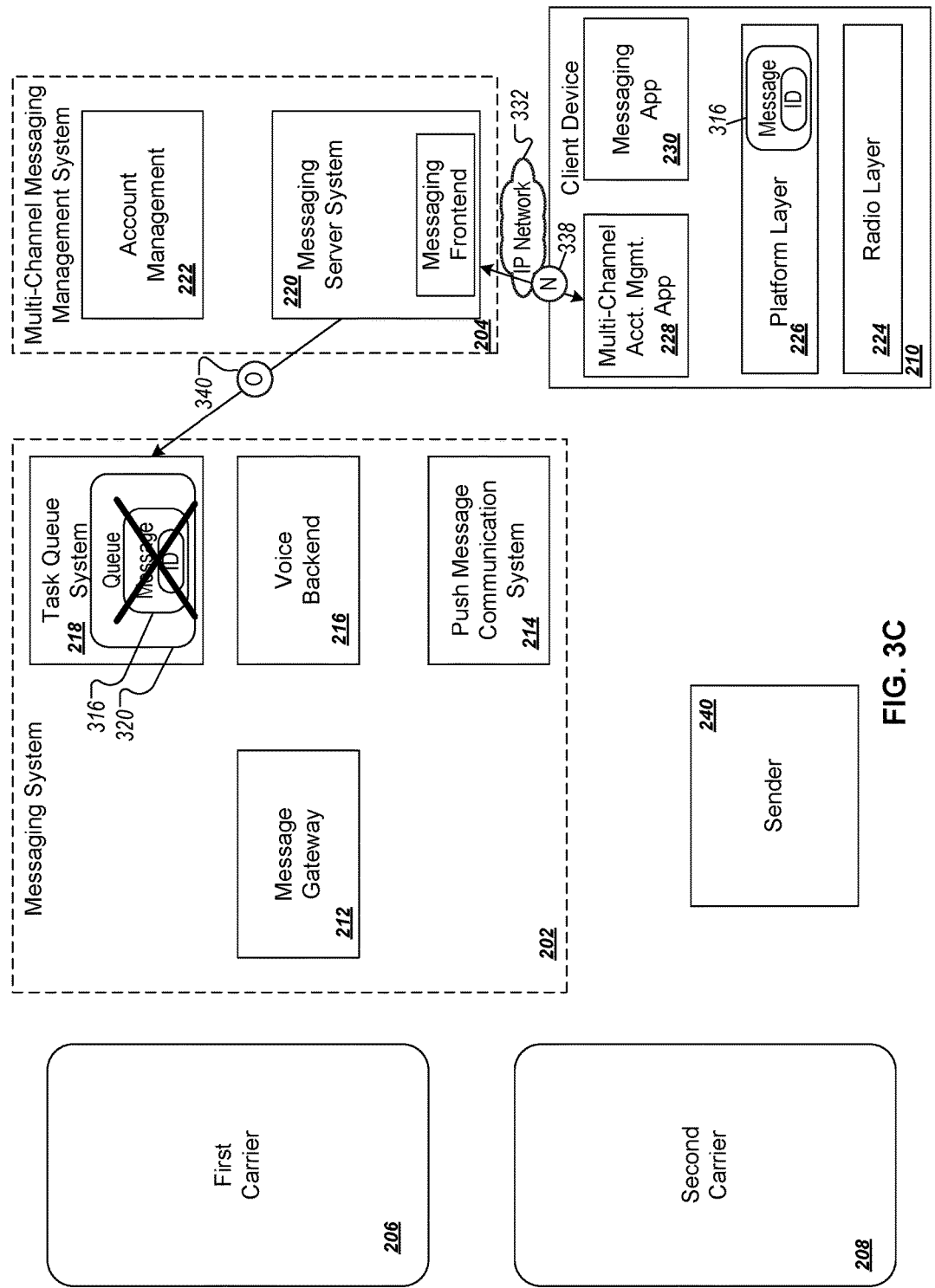

Referring to FIG. 3C, once the message 316 has been inserted into the platform layer 226 of the client device 210, the multi-channel account management app 228 can notify the messaging server system 220 that the message 316 has been received (Step N, 338) and the messaging server system 220 can delete the message 316 from the queue 320 in the task queue system 218 (Step O, 340).

Figure 3D:
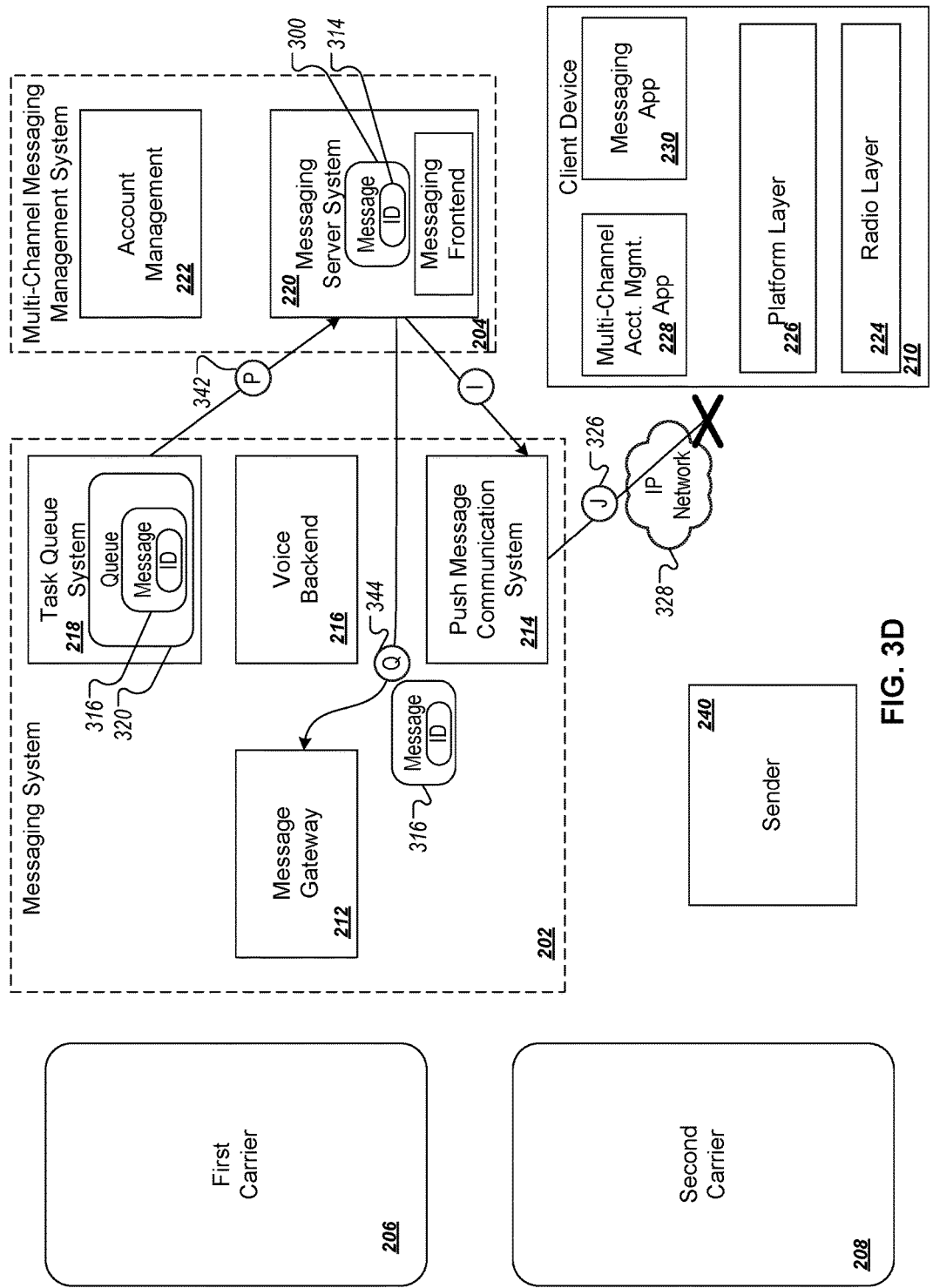

Referring to FIG. 3D, in instances where the client device 210 does not have a connection over the IP network 328 (as indicated by Step J (326) failing), the task associated with the message 316 in the queue system 218, which has not been deleted, times out and is delivered back to the messaging server system 220 for (synchronous) delivery over a PSTN communication channel (Step P, 342). The messaging server system 220 passes the message 316 (with ID) to the messaging gateway 212 for transmission over the PSTN communication channel (Step Q, 344).

Figure 3E:
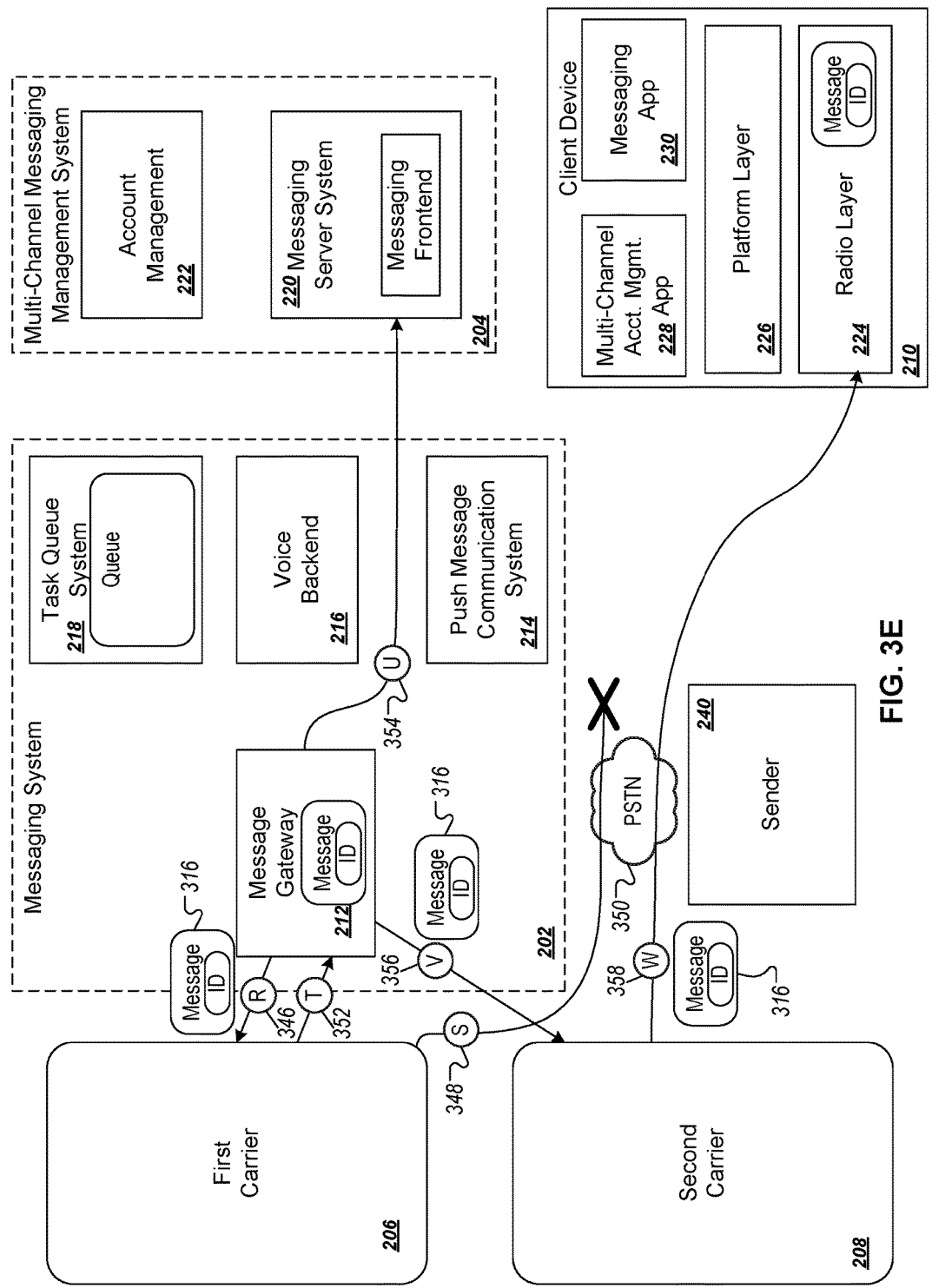

Referring to FIG. 3E, the messaging gateway 212 attempts to deliver the message 316 via the first carrier 206 in "transaction mode," which can inform the messaging system 202 if the delivery fails (e.g., if the client device 210 is not connected to the first carrier 206). For example, the messaging gateway 212 can send the message 316 to the first carrier 206 (Step R, 346), which can be notified when the message 316 is not delivered to the client device 210 over a PSTN communication channel 350 (Step S, 348). The delivery failure can be retransmitted to the messaging gateway 212 (Step T, 352), which can provide notification of the failure to the multi-channel messaging management system 204 (Step U, 354). The messaging system 202 can then attempt to deliver the message 316 via the second carrier 208 (Step V, 356), which, assuming that the client device 210 is connected to the PSTN communication channel 350, causes the message 316 to be successfully delivered to the client device 210 and its radio layer 224 (Step W, 358) via transaction mode.

Figure 3F:
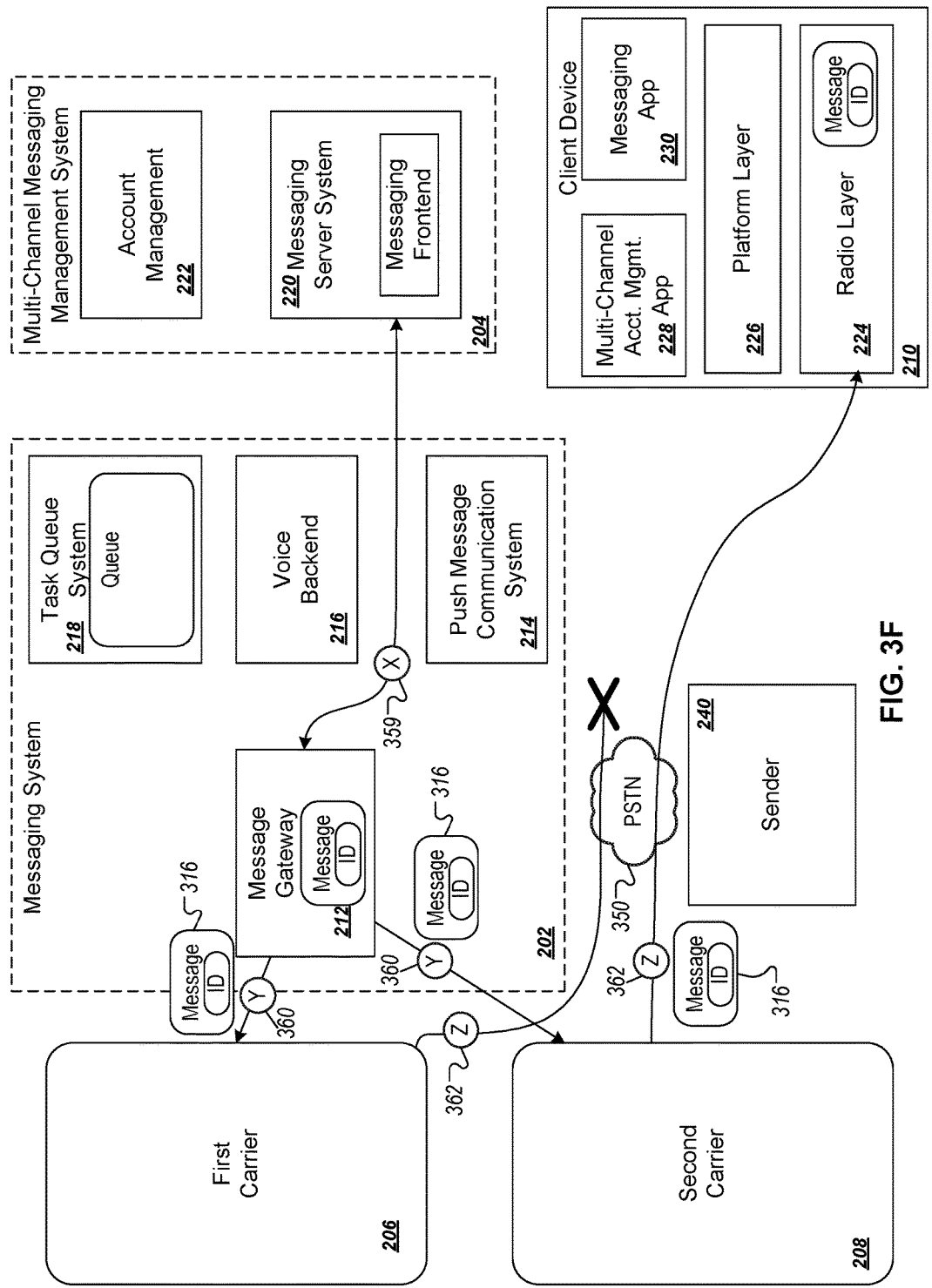

Referring to FIG. 3F, if transaction mode fails for all available networks (e.g., failure for the second carrier 208 as well), the multi-channel messaging management system 204 can direct the message gateway 212 (Step X, 359) to send the message 316 to all carriers 206, 208, and/or others not depicted for delivery without delivery receipts (Step Y, 360). Under this situation, the other carriers (carriers 206, 208, and/or others not depicted) may still attempt to deliver the message 316 in transaction mode for X period of time (e.g., X number of hours, days, or other units of time, where X depends on the carrier), which can cause duplicate messages to be delivered to the client device 210. The carriers (carriers 206, 208, and/or others not depicted) can then attempt to deliver the message 316 to the client device 210 over the PSTN 350 (Step Z, 362).

Figure 3G:
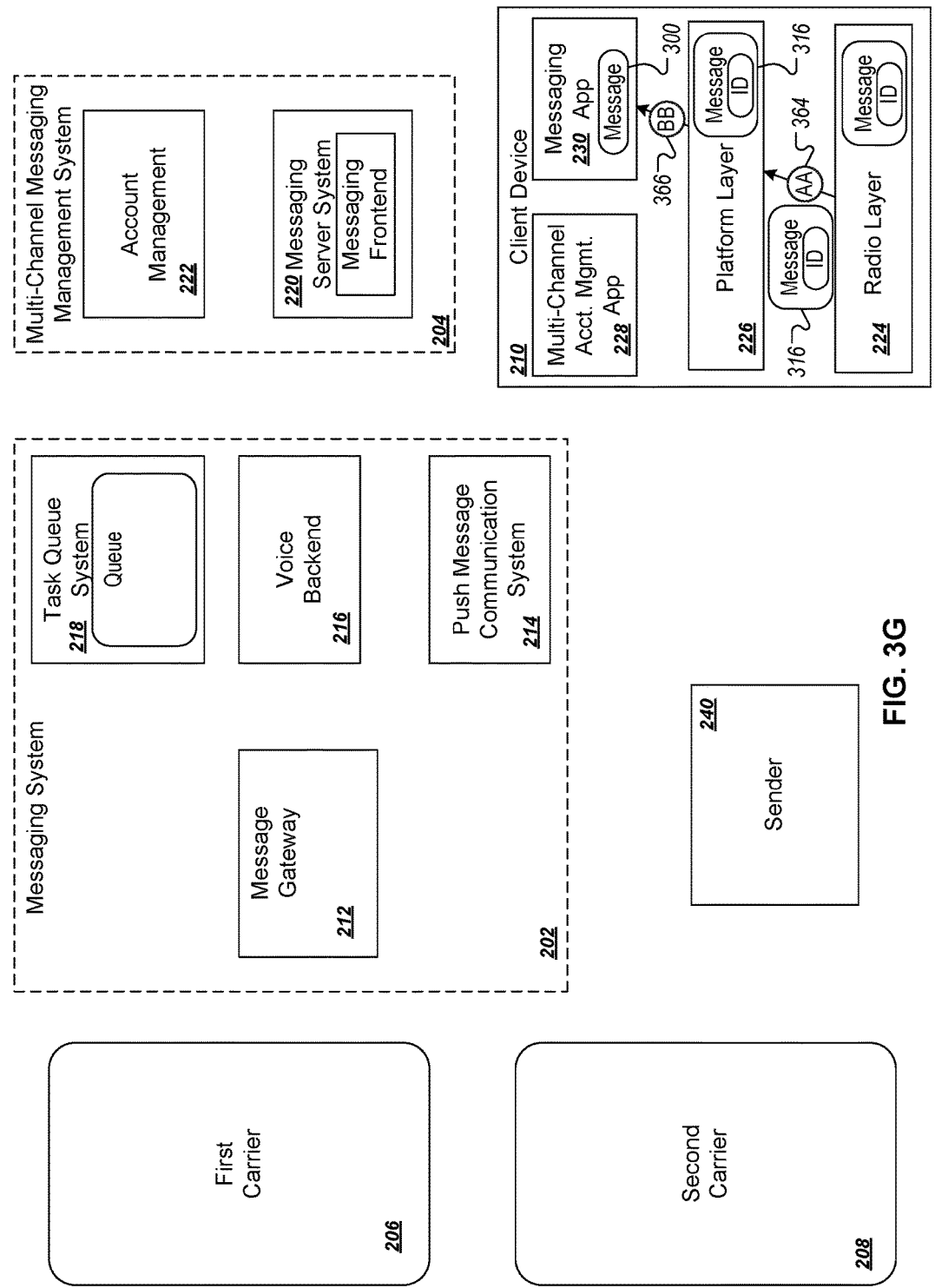

Referring to FIG. 3G, once the message 316 gets to the client device 210, it is inserted into the message database in the platform layer 226 (Step AA, 364) and, once inserted into the platform layer 226 (regardless of whether it arrived there via IP or PSTN delivery), the message 316 can be picked up by the messaging app 230 (Step BB, 366). The multi-channel account management app 228 and/or the messaging app 230 can be responsible for tracking unique identifiers for messages, removing/deleting duplicates from the message database in the platform layer 226, and stripping out any identifiers (ID) that have been inserted into the message 316 so that message is presented with only the content of the original message transmitted by the sender 240 (and without the identifiers inserted by the messaging server system 220). For instance, the messaging app 230 is depicted as presenting the message 300 (without the ID) as originally transmitted by the sender 240.

FIGS. 4A-D depict transmission of an outbound message 400 over multiple communication channels using the example system described in FIGS. 2 and 3A-G. The steps described across FIGS. 4A-D correspond to the outbound message 400 delivery described above with regard to FIG. 1B.

Figure 4A:
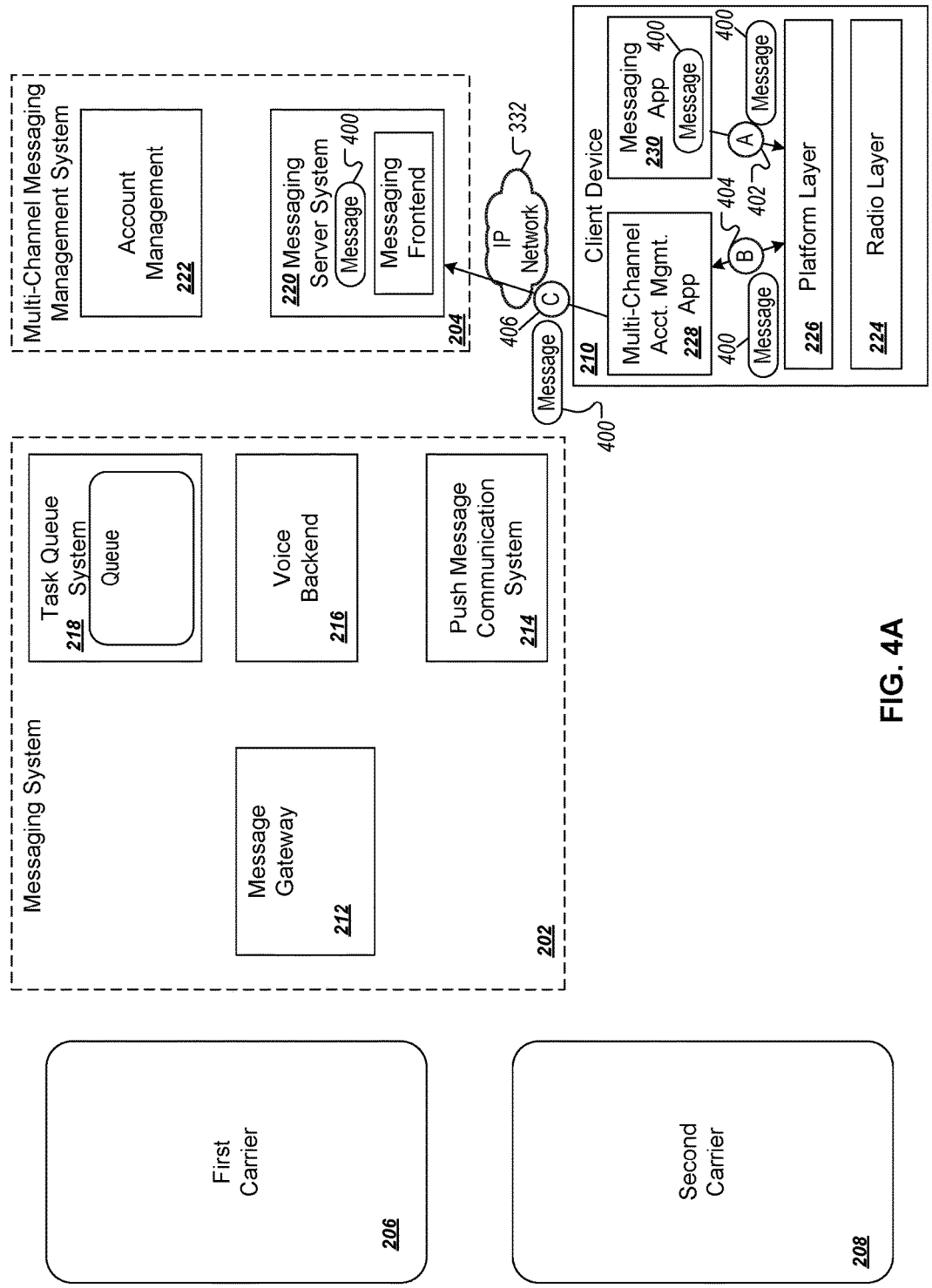
FIGS. 4A-D depict transmission of an outbound message over multiple communication channels using the example system described in FIG. 2.

Referring to FIG. 4A, a user inputs a message 400 into the messaging app 230 (e.g., typing text, identifying a recipient, presses send), which writes the message 400 into the platform layer 230 (Step A, 402). The multi-channel account management app 228 can intercept all outgoing messages from the platform layer 226 and can first attempt to send them out over an IP communication channel 332 (Step B, 404). To do this, the multi-channel account management app 228 can attempt deliver the message 400 to the messaging server system 220 over an IP network connection 332 (Step C, 406).

Figure 4B:
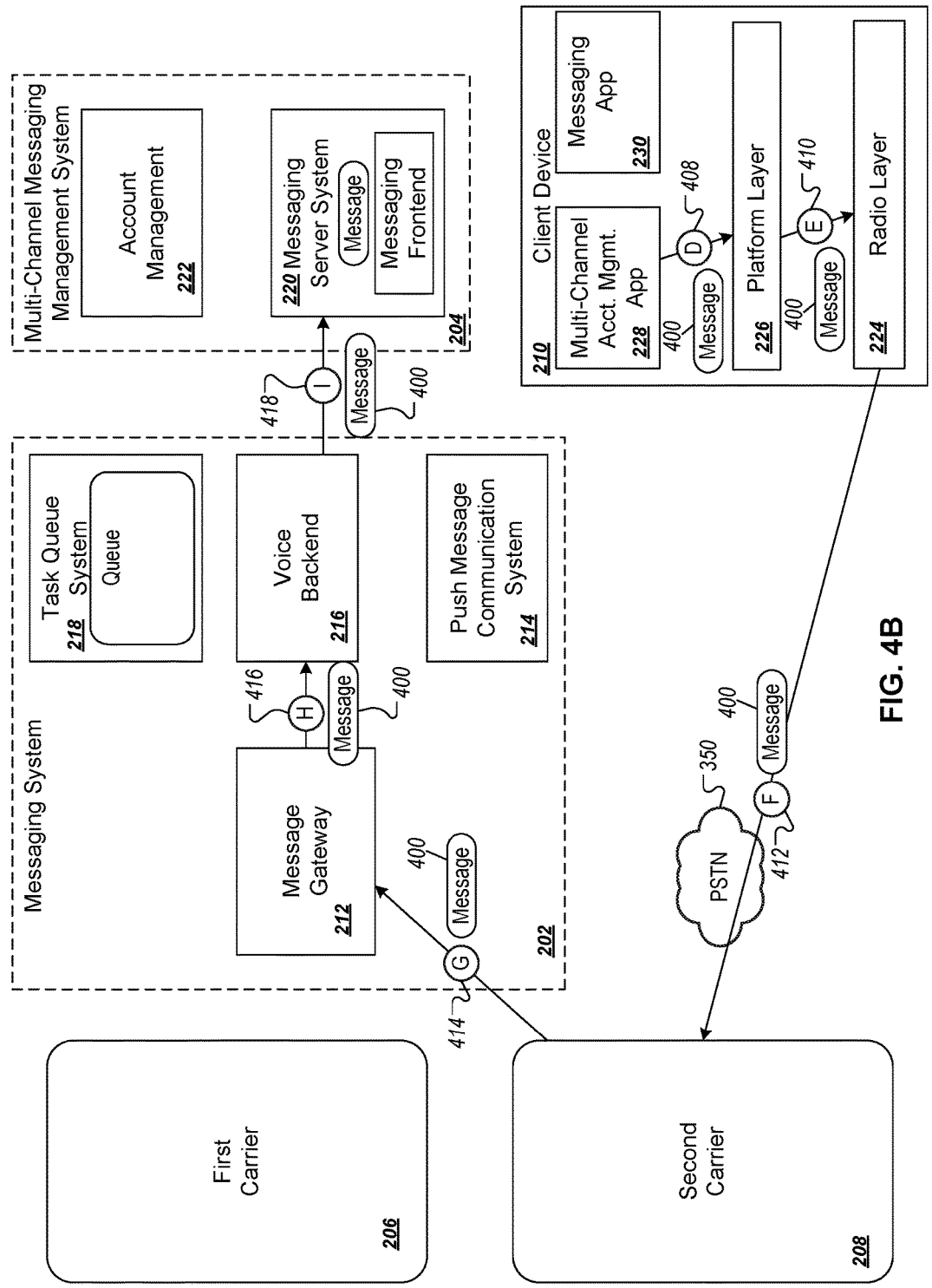

Referring to FIG. 4B, if the multi-channel account management app's (228) delivery of the message 400 to the messaging server system 220 fails, then the multi-channel account management app 228 can write the message 400 back to the platform layer 226 (and can include a note to prevent intercepting the message again, which would create a loop) (Step D, 408), which can push the message 400 out via the radio layer 224 (Step E, 410) and over an active PSTN connection 350 (Step F, 412). Carrier partners, such as the second carrier 208, can recognize the message 400 as a multi-channel message and can route the message 400 back to the messaging system 202 for processing via the message gateway 212 (Step G, 414). Once the message 400 is received at the message gateway 212, it is again passed to the voice backend (step H, 416), and to the messaging server system 220 (Step I, 418).

Figure 4C:
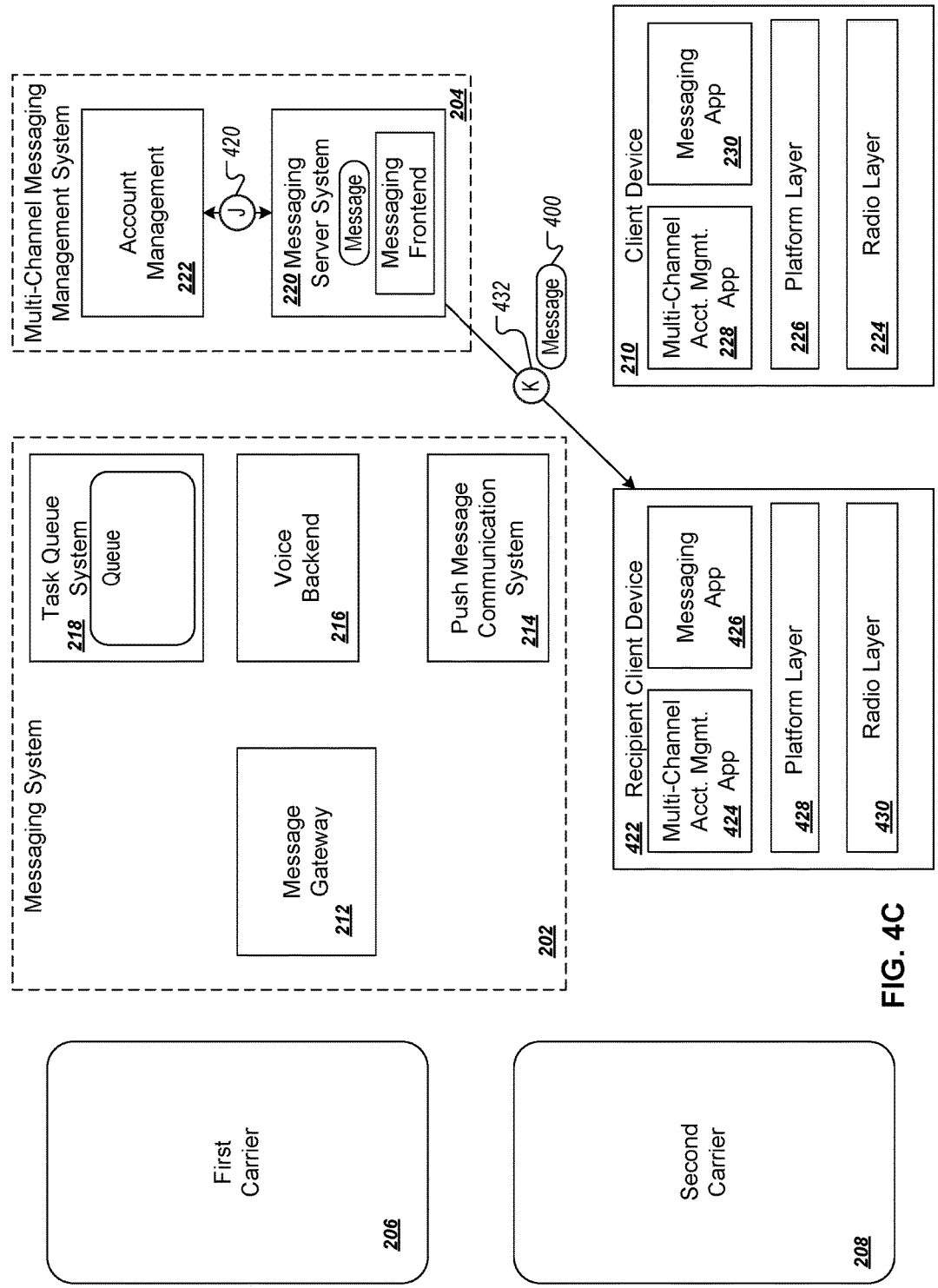

Referring to FIG. 4C, once the messaging server system 220 receives the message 400, it can check with the account management component 222 to determine whether the recipient is associated with the multi-channel messaging management system 204 (Step J, 420). The recipient can be enrolled in any of a variety of ways, such as through installing/enabling/activating a multi-channel account management app on the recipient device. For example, the client device 210 can be determined to be associated with the multi-channel messaging management system 204 based on the multi-channel account management app 228 being installed/enabled/activated on the client device 210. Similarly, the example recipient client device 422 that is depicted includes a similar multi-channel account management app 424 that is installed/enabled/activated, as well as a messaging app 426 (similar to the messaging app 230), a platform layer 428 (similar to the platform layer 226), and a radio layer 430 (similar to the radio layer 224). If the recipient device 422 is determined to be associated with the multi-channel messaging management system 204, then the message 400 can be transmitted to the recipient client device 422 according to the inbound message delivery steps described above with regard to FIGS. 3A-G (Step K, 432).

Figure 4D:
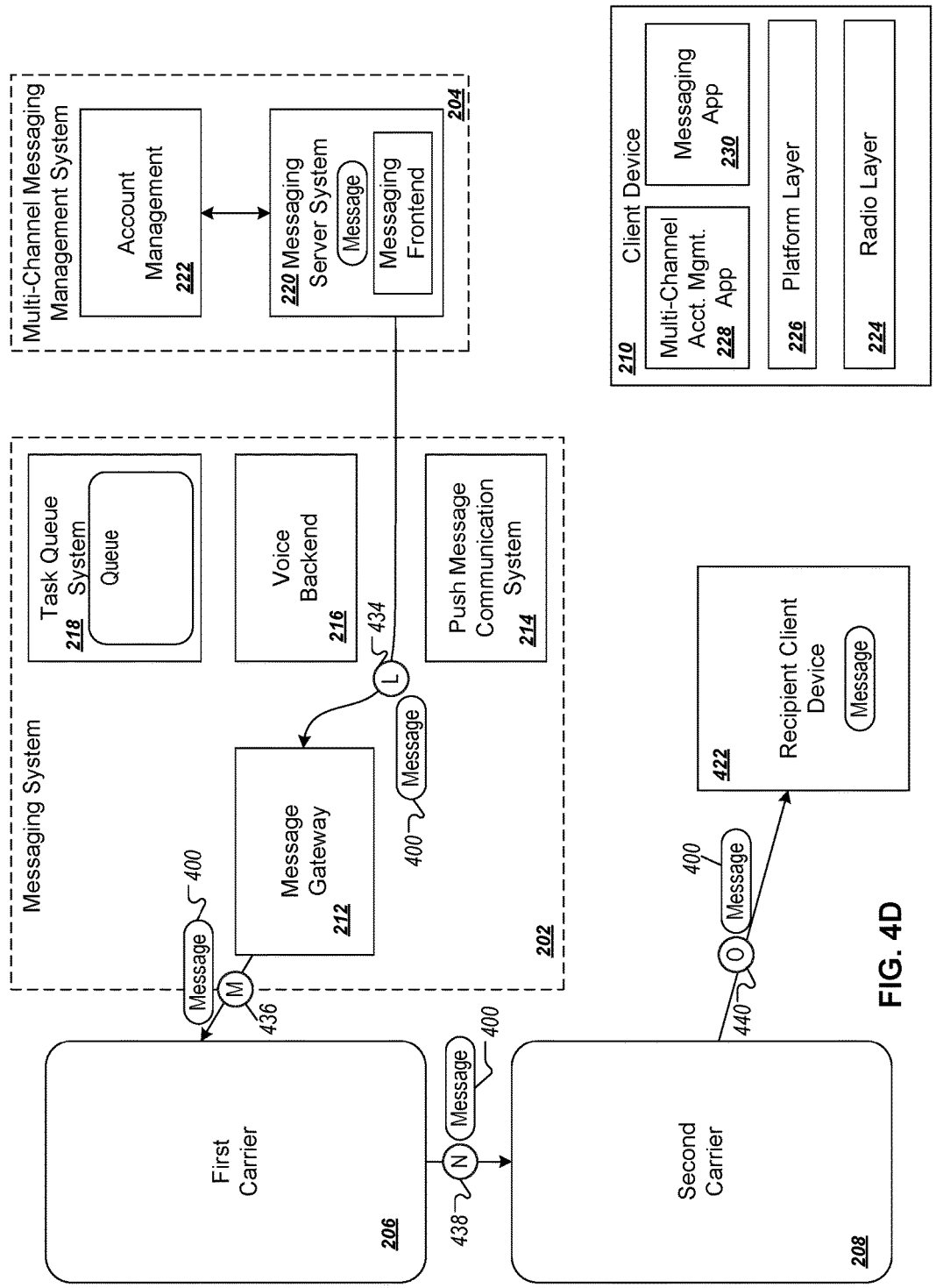

Referring to FIG. 4D, if the recipient device 422 is determined to not be associated with the multi-channel messaging management system 204 (e.g., the recipient client device 422 does not include a multi-channel account management app installed/enabled/activated), then the messaging server system 220 can provide the message 400 to the message gateway 212 (Step L. 434). If the source number is a dark number (i.e. the message 400 was received by the multi-channel messaging management system 204 via PSTN over the second carrier 208 from the client device 210), the messaging server system 220 can change the source number in the message 400 to a light number before passing it to the message gateway 212. To avoid/minimize problems with spam filters, the outbound messages can be passed to the carrier associated with the client device 210 that sent the message 400 (first carrier 206—Step M, 436) so that the source number matches the carrier that delivers it. The first carrier 206 can pass the message 400 to the recipient's carrier, which in this example is the second carrier 208 (Step N, 438), which can deliver the message 400 to the recipient device 422 (Step O, 440).

Although not described with regard to FIGS. 4A-D, identifiers can be inserted into outbound messages to ensure multi-channel delivery and to remove duplicates. For example, the multi-channel account management app 228 and/or the messaging app 230 can insert an identifier into the message 400, which can be used by the messaging server system 220 and the multi-channel messaging management system 204 to eliminate duplicate messages from being transmitted to via the messaging server system 220 to the recipient device 422. For example, the messaging server system 220 can log unique identifiers for received messages (e.g., sender/recipient/ID tuple, heuristic identifiers), can delete messages that are duplicates based on the logged identifiers for messages that have already been received, and can strip out inserted identifiers from the messages before they are transmitted to the recipient device 422.

Figure 5A:
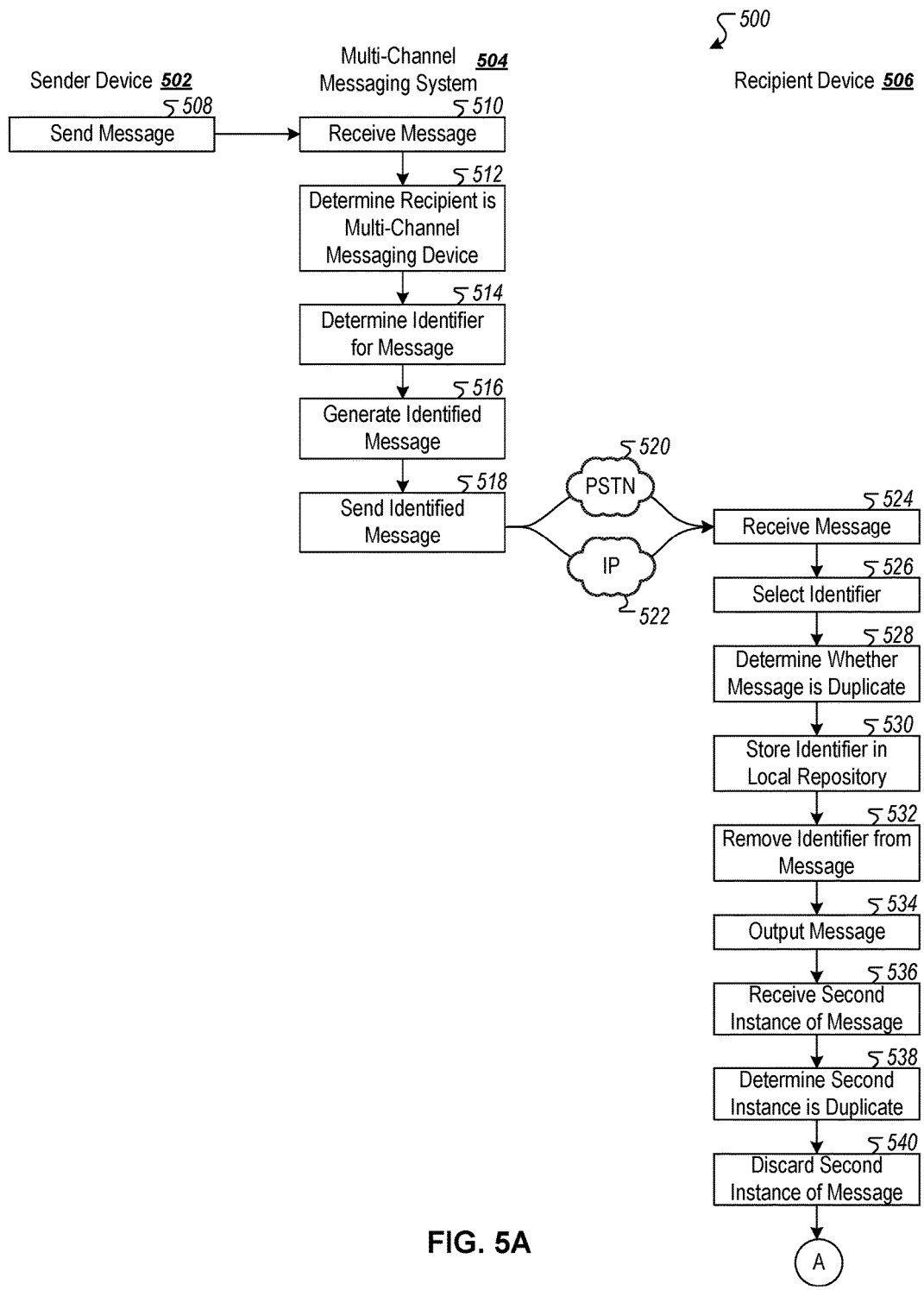
FIGS. 5A-B are flowcharts of an example technique for sending and receiving messages using multiple channels.
Figure 5B:
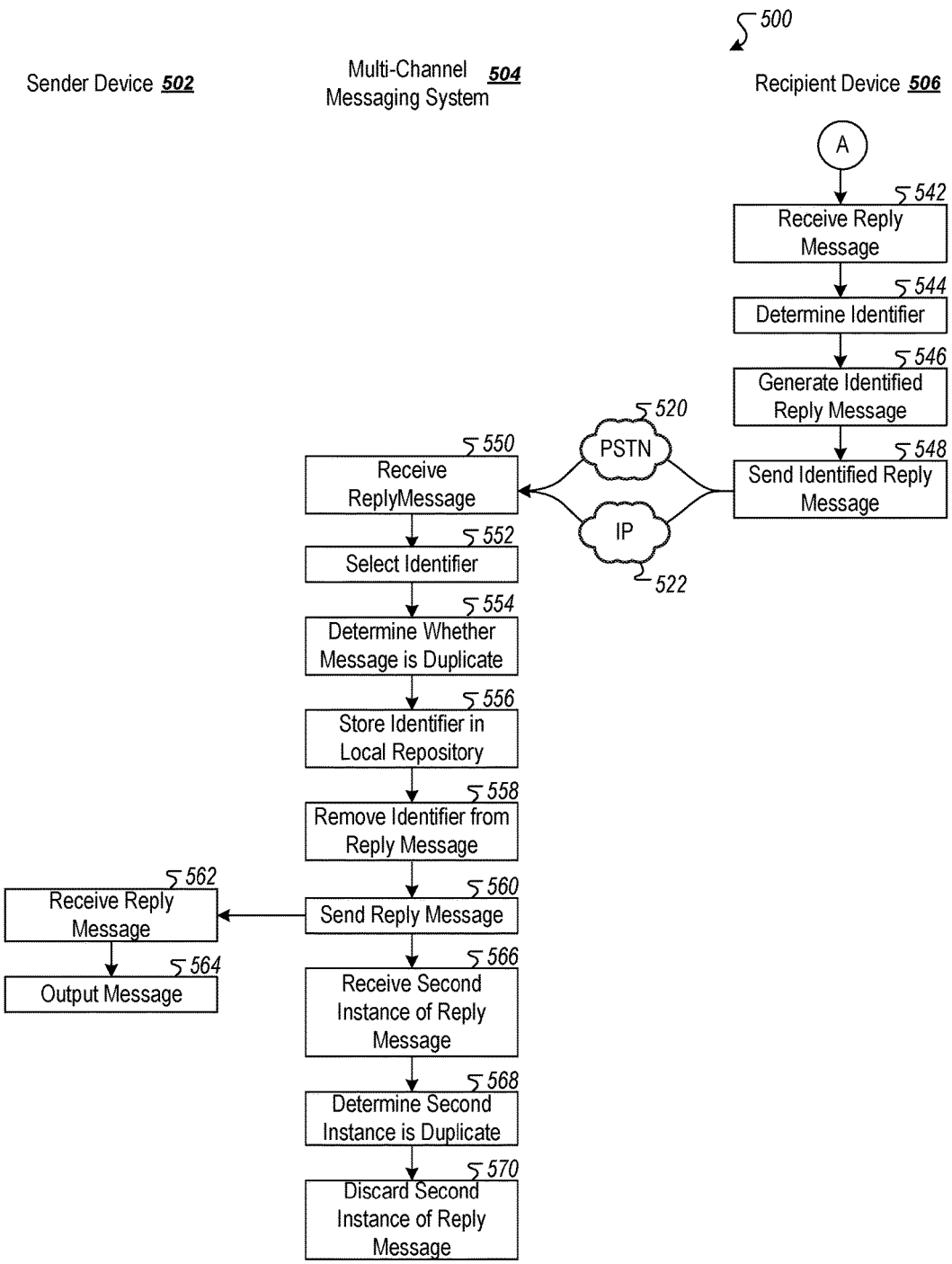

FIGS. 5A-B are flowcharts of an example technique 500 for sending and receiving messages, such a SMS and MMS messages, using multiple channels, such as IP and PSTN communication channels. Portions of the example technique 500 are depicted as being performed by a sender device 502, a multi-channel messaging system 504, and a recipient device 506. The sender device 502 can be similar to the devices 102, 240, and/or 422 described above with regard to FIGS. 1-4. The multi-channel messaging system 504 can be similar to the multi-channel messaging systems 110 and/or 202/204 described above with regard to FIGS. 1-4. The recipient device 506 can be similar to the devices 104 and/or 204 described above with regard to FIGS. 1-4. In this example, the recipient device 506 can be configured to send and receive multi-channel messages, and can be associated with the multi-channel messaging system 504. The sender device 502 may or may not be able to do the same and/or be associated with the multi-channel messaging system 504.

The sender device 502 can send a message, such as an SMS or MMS message (508). The multi-channel messaging system 504 can receive the message (510) and can determine whether the recipient is a multi-channel messaging device capable of receiving multi-channel messages (512). In response to determining that the recipient device 506 is a multi-channel messaging device, the multi-channel messaging system 504 can determine an identifier for the message (514) and can generate an identified message by inserting/appending/concatenating the identifier into the message (516). For instance, steps A-G (302-318) described above with regard to FIG. 3A provide an example of the message 300 being received by the message server system 200 and the ID 314 being used to generate the identified message 316 to be transmitted to the client device 210.

The multi-channel messaging system 504 can send the identified message over one or both of the PSTN 520 and the IP 522 communication channels (518). For example, in some instances the multi-channel messaging system 504 may attempt to first transmit the identified message over the IP channel 522 and then over the PSTN channel 520. In other instances, the multi-channel messaging system 504 can do the opposite—first attempting transmission over the PSTN channel 520 and then over the IP channel 522. In other instances, the multi-channel messaging system 504 can simultaneously transmit over both the PSTN channel 520 and the IP channel 522. An example of sending the message over the different channels 520-522 are described above with regard to steps H-Z (322-362) depicted in FIGS. 3B-3F.

The recipient device 506 can receive the identified message (524), can select the identifier contained in the message (526), and can determine whether the message is a duplicate based on the identifier (528). For example, the recipient device 506 can store check the identifier against a local database of received messages and, if the identifier is not present in the local repository/database, the recipient device 506 can determine that the message is not a duplicate. When the message is not a duplicate, the identifier can be stored in the repository/database (530) and the identifier can be removed from the message (532). With the identifier removed, the message can be output by the recipient device 506 (536). An example of checking whether the message is a duplicate, removing the identifier, and outputting the message are described above with regard to steps AA-BB (364-366) as depicted in FIG. 3G.

The recipient device 506 can receive a second instance of the message (536), can select the identifier from the second instance of the message and can use the identifier to determine whether the second instance is a duplicate (538). In some instances, the identified message may be delivered to the recipient device 506 more than once over the PSTN channel 520 and/or the IP channel 522. The database/repository of received messages can be referenced to determine whether the second instance is a duplicate. In response to determining that the second instance is a duplicate, the second instance of the message can be discarded (540). Discarding the second instance can include, for example, deleting the second instance of the message from the message database in the platform layer 226 before the messaging app 230 is alerted to second instance of the message, so as to avoid the second instance of the message being output multiple times by the messaging app 230.

Referring to FIG. 5B, a reply message can be received by the recipient device 506 (542), which can cause the recipient device 506 to determine an identifier for the message (544) and to generate an identified reply message 546 that includes the identifier (546). For example, the multi-channel account management app 228 and/or the messaging app 230 on the client device 210 can determine an identifier for the received message. In some instances, the client device 210 may not generate or use a unique identifier until after one or more steps to initially transmit the message with delivery confirmation have failed, such as transmission over the IP network 332 and/or over a PSTN in transaction mode having failed. The recipient device 506 can send the reply message over the PSTN channel 520 and/or the IP channel 522 (548). For example, FIGS. 4A-B depict steps A-I (402-418) transmitting the message over the IP network 332 and/or the PSTN channel 350 to the messaging server system 220.

The multi-channel messaging system 504 can receive the reply message (550) and, if there is an identifier included in the message, can select the identifier in the reply message (552), use the identifier to determine whether the message is a duplicate (554), store the identifier in a local database/repository if the message is not a duplicate (556), can remove the identifier from the reply message (558), and can send the reply message (without the identifier) to the device 502 (560). For example, FIGS. 4C-D depict steps J-O (420-440) for transmitting such a reply message to the client device 422. The device 502 (which is acting as a recipient device in this instance) receives the reply message (with identifier having already been removed by the system 504) (562) and outputs the message (564).

The multi-channel messaging system 504 may receive a second instance of the reply message (566) and can use the identifier contained in the second instance of the reply message to determine whether it is a duplicate (568). If the second instance of the message is a duplicate, it can be discarded by the system 504 without being transmitted to the device 502 (570).

The steps 542-570 (the device 506 sending a message over multiple channels to the system 504) can be performed separately from the steps 508-540 (the device 506 receiving a message from the system 504 over multiple channels), and/or in a different order (e.g., the sending steps can be performed before the receiving steps). Although not depicted, the system 504 may additionally interact with the device 502 over multiple channels, which can involve similar steps as those described with regard to the sending and receiving of messages between the system 504 and the device 506.

Figure 6:
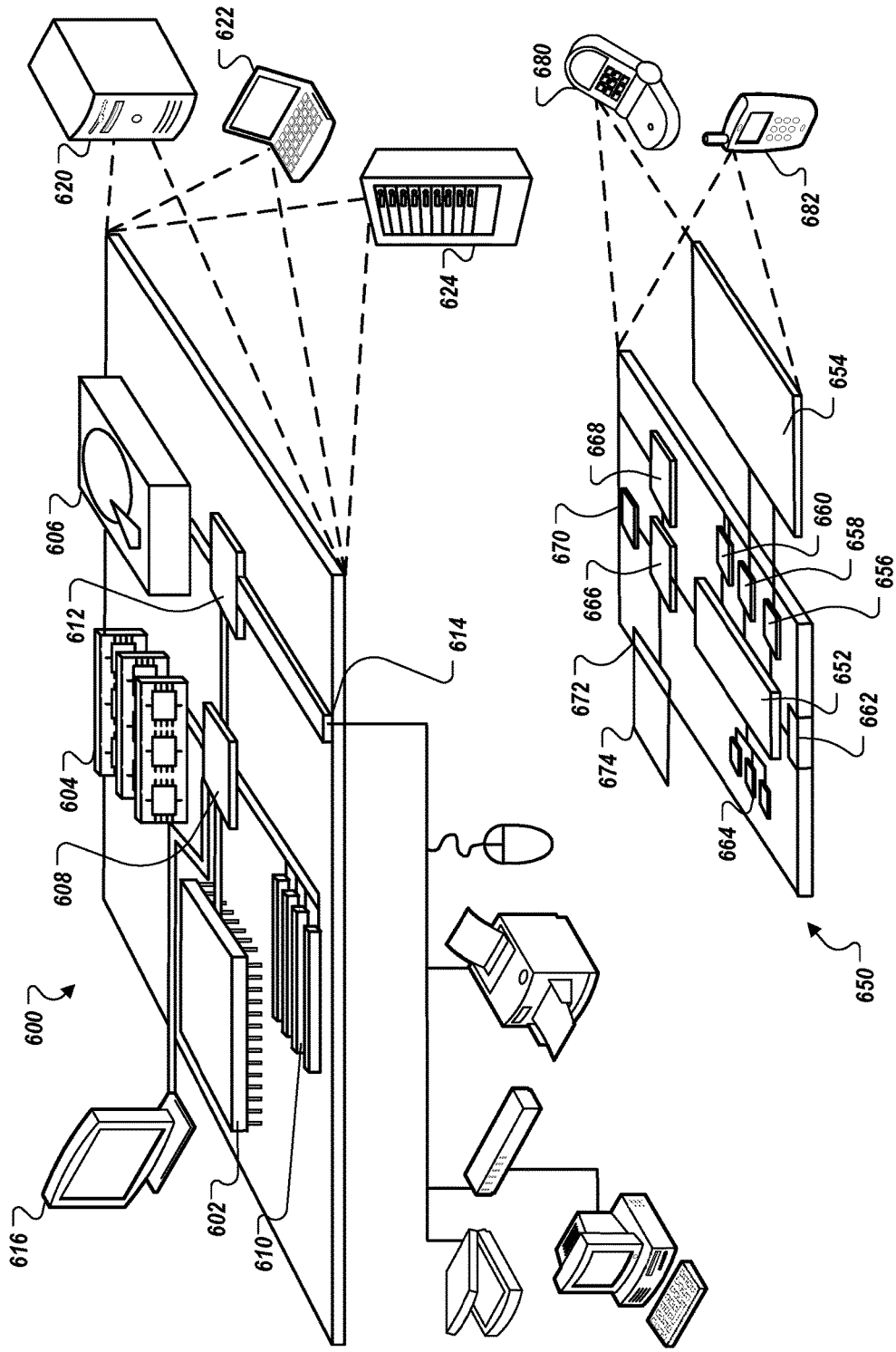
FIG. 6 is a block diagram of example computing devices that may be used to implement the systems and methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
receiving, at a computer system and from a sender computing device, a transmitted message for delivery to a recipient computing device;
determining, by the computer system, a unique identifier for the transmitted message;
generating an identified message, the identified message including the transmitted message and at least a portion of the unique identifier;
sending, by the computer system and to the recipient computing device, the identified message over a first communication channel and a second communication channel, wherein the first communication channel is different from the second communication channel;
receiving, at the recipient computing device and over the first communication channel, the identified message from the computer system;
in response to receiving the identified message from the computer system over the first communication channel:
(i) identifying, by the recipient computing device, the unique identifier in the identified message;
(ii) determining, by the recipient computing device, that the identified message is not a duplicate message based on a comparison of the unique identifier with a local device repository of unique message identifiers;
(iii) storing, in response to the determining that the identified message is not a duplicate message, the unique identifier in the local device repository of unique message identifiers; and
(iv) generating, by the recipient computing device, a modified message that comprises the identified message with at least a portion of the unique identifier removed and causing the modified message to be presented by the recipient computing device;
receiving, at the recipient computing device and over the second communication channel that is different from the first communication channel, a second instance of the identified message;
in response to receiving the second instance of the identified message:
(i) determining that the second instance of the identified message is the duplicate of the identified message based on a comparison of a unique identifier in the second instance of the identified message with the local device repository of unique message identifiers; and
(ii) discarding, by the recipient computing device and in response to the determining that the second instance of the identified message is the duplicate of the identified message, the second instance of the identified message;
generating, by the recipient computing device, a reply message to the transmitted message, the reply message including content input by a user of the recipient computing device through the recipient computing device, and a reply unique identifier for the reply message;
receiving, at the computer system and over the first communication channel, a first instance of the reply message to the transmitted message, the reply message being from the recipient computing device for delivery to the sender computing device;
in response to receiving the first instance of the reply message from the recipient computing device:
(i) identifying, by the computer system, the reply unique identifier in the first instance of the reply message;
(ii) storing, by the computer system, the reply unique identifier in a local system repository;
(iii) generating, by the computer system, a modified reply message that comprises the reply message with the content input by the user of the recipient computing device included and with at least a portion of the reply unique identifier removed; and
(iv) sending, by the computer system, the modified reply message to the sender computing device;
receiving, at the computer system and over the second communication channel, a second instance of the reply message, the reply message being from the recipient computing device for delivery to the sender computing device; and
in response to receiving the second instance of the reply message from the recipient computing device:
(i) determining, by the computer system, that the second instance of the reply message is a duplicate reply message based on a comparison of the reply unique identifier in the second instance of the reply message with the reply unique identifier in the first instance of the reply message stored in the local system repository; and
(ii) discarding, by the computer system and in response to determining that the second instance of the reply message is the duplicate reply message, the second instance of the reply message.

2. The computer-implemented method of claim 1, wherein the unique identifier comprises: (i) a recipient identifier for the recipient computing device, (ii) a sender identifier for the sender computing device having sent the transmitted message, and (iii) an interaction identifier, the interaction identifier being unique to messages associated with the recipient identifier and the sender identifier.

3. The computer-implemented method of claim 2, wherein:
the recipient identifier and the sender identifier are included in the transmitted message, and
the interaction identifier is added to the identified message as the at least a portion of the unique identifier.

4. The computer-implemented method of claim 2, wherein:
the recipient identifier and the sender identifier are included in the identified message, and
at least the interaction identifier and the sender identifier are stored in the local device repository of unique message identifiers.

5. The computer-implemented method of claim 1, wherein the transmitted message comprises a text message.

6. The computer-implemented method of claim 1, wherein the first communication channel comprises a public switched telephone network (PSTN) and the second communication channel comprises an internet protocol (IP) network.

7. The computer-implemented method of claim 1, wherein the identified message comprises a text message.

8. The computer-implemented method of claim 1, wherein the first communication channel comprises an IP network and the second communication channel comprises a PSTN.

9. A computer system for sending messages over multiple channels, the system comprising:

one or more processors;

memory storing instructions that, when executed, cause the one or more processors to perform operations comprising:

receiving, at a computer system and from a sender computing device, a transmitted message for delivery to a recipient computing device;

determining, by the computer system, a unique identifier for the transmitted message;

generating an identified message, the identified message including the transmitted message and at least a portion of the unique identifier;

sending, by the computer system and to the recipient computing device, the identified message over a first communication channel and a second communication channel, wherein the first communication channel is different from the second communication channel;

receiving, at the recipient computing device and over the first communication channel, the identified message from the computer system;

in response to receiving the identified message from the computer system over the first communication channel:
  (i) identifying, by the recipient computing device, the unique identifier in the identified message;
  (ii) determining, by the recipient computing device, that the identified message is not a duplicate message based on a comparison of the unique identifier with a local device repository of unique message identifiers;
  (iii) storing, in response to the determining that the identified message is not a duplicate message, the unique identifier in the local device repository of unique message identifiers; and
  (iv) generating, by the recipient computing device, a modified message that comprises the identified message with at least a portion of the unique identifier removed and causing the modified message to be presented by the recipient computing device;

receiving, at the recipient computing device and over the second communication channel that is different from the first communication channel, a second instance of the identified message;

in response to receiving the second instance of the identified message:
  (i) determining that the second instance of the identified message is the duplicate of the identified message based on a comparison of a unique identifier in the second instance of the identified message with the local device repository of unique message identifiers; and
  (ii) discarding, by the recipient computing device and in response to the determining that the second instance of the identified message is the duplicate of the identified message, the second instance of the identified message;

generating, by the recipient computing device, a reply message to the transmitted message, the reply message including content input by a user of the recipient computing device through the recipient computing device, and a reply unique identifier for the reply message;

receiving, at the computer system and over the first communication channel, a first instance of the reply message to the transmitted message, the reply message being from the recipient computing device for delivery to the sender computing device;

in response to receiving the first instance of the reply message from the recipient computing device:
  (i) identifying, by the computer system, the reply unique identifier in the first instance of the reply message;
  (ii) storing, by the computer system, the reply unique identifier in a local system repository;
  (iii) generating, by the computer system, a modified reply message that comprises the reply message with the content input by the user of the recipient computing device included and with at least a portion of the reply unique identifier removed; and
  (iv) sending, by the computer system, the modified reply message to the sender computing device;

receiving, at the computer system and over the second communication channel, a second instance of the reply message, the reply message being from the recipient computing device for delivery to the sender computing device; and in response to receiving the second instance of the reply message from the recipient computing device:
  (i) determining, by the computer system, that the second instance of the reply message is a duplicate reply message based on a comparison of the reply unique identifier in the second instance of the reply message with the reply unique identifier in the first instance of the reply message stored in the local system repository; and
  (ii) discarding, by the computer system and in response to determining that the second instance of the reply message is the duplicate reply message, the second instance of the reply message.

10. The computer system of claim 9, wherein the unique identifier comprises: (i) a recipient identifier for the recipient computing device, (ii) a sender identifier for the sender computing device having sent the transmitted message, and (iii) an interaction identifier, the interaction identifier being unique to messages associated with the recipient identifier and the sender identifier.

11. The computer system of claim 10, wherein:
the recipient identifier and the sender identifier are included in the transmitted message, and
the interaction identifier is added to the identified message as the at least a portion of the unique identifier.

12. The computer system of claim 9, wherein the transmitted message comprises a text message.

13. The computer system of claim 9, wherein the first communication channel comprises a public switched telephone network (PSTN) and the second communication channel comprises an internet protocol (IP) network.

* * * * *

UNITED STATES PATENT AND TRADEMARK OFFICE
CERTIFICATE OF CORRECTION

| | | |
|---|---|---|
| PATENT NO. | : 10,305,843 B2 | Page 1 of 1 |
| APPLICATION NO. | : 15/135021 | |
| DATED | : May 28, 2019 | |
| INVENTOR(S) | : Rowny et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 177 days.

Signed and Sealed this
Sixth Day of December, 2022

*Katherine Kelly Vidal*
Katherine Kelly Vidal
*Director of the United States Patent and Trademark Office*